(12) United States Patent
Suraqui

(10) Patent No.: US 7,508,324 B2
(45) Date of Patent: Mar. 24, 2009

(54) FINGER ACTIVATED REDUCED KEYBOARD AND A METHOD FOR PERFORMING TEXT INPUT

(76) Inventor: Daniel Suraqui, 6-b Yam Suf Street, Ramat Eshkol, Jerusalem (IL)

( * ) Notice: Subject to any disclaimer, the term of this patent is extended or adjusted under 35 U.S.C. 154(b) by 649 days.

(21) Appl. No.: 11/085,206

(22) Filed: Mar. 22, 2005

(65) Prior Publication Data

US 2006/0028450 A1 Feb. 9, 2006

Related U.S. Application Data

(60) Provisional application No. 60/645,965, filed on Jan. 24, 2005, provisional application No. 60/599,216, filed on Aug. 6, 2004.

(51) Int. Cl.
*H03M 11/00* (2006.01)
(52) U.S. Cl. .............................. 341/22; 341/28; 341/20; 345/168; 345/173; 717/136; 704/9; 715/810
(58) Field of Classification Search ............. 341/20, 341/22, 28; 345/171, 173, 168; 715/810, 715/811; 704/9; 717/136
See application file for complete search history.

(56) References Cited

U.S. PATENT DOCUMENTS

| | | | | |
|---|---|---|---|---|
| 5,945,928 | A * | 8/1999 | Kushler et al. | 341/28 |
| 6,104,317 | A * | 8/2000 | Panagrossi | 341/20 |
| 6,362,752 | B1 * | 3/2002 | Guo et al. | 341/28 |
| 7,199,786 | B2 * | 4/2007 | Suraqui | 345/168 |
| 7,310,053 | B2 * | 12/2007 | Bollman | 341/22 |
| 7,376,938 | B1 * | 5/2008 | Van der Hoeven | 717/136 |
| 7,444,021 | B2 * | 10/2008 | Napper | 382/186 |
| 7,477,238 | B2 * | 1/2009 | Fux et al. | 345/169 |

* cited by examiner

*Primary Examiner*—Albert K Wong

(57) ABSTRACT

A reduced keyboard apparatus and method for use with small-sized communications and computing devices. Input via the keyboard is performed using fingers or thumbs. The keyboard is characterized by having no discrete boundaries between the included character spaces. The direction and the destination area of a keystroke do not have to be accurate and may correspond to a plurality of included character spaces. Each of the possible characters is provided with a probability value, continuously redefined according to the specific keyboard area activated by the keystroke. The input of a word is defined by a sequence of keystrokes corresponding to the letters of the word. Subsequent to the completion of a keystroke sequence, the apparatus and method determine the identity of the word through a disambiguation process based on area density distribution. The apparatus and method enable fast, natural, and intuitive tapping on small keyboards having character areas much smaller than the user's fingers while at the same time provide highly efficient word determination.

25 Claims, 16 Drawing Sheets

FIG. 3A

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 1 | 2 | 3 | 4 | 5 | 4 | 3 | 2 | 1 | 0 | 0 | 0 | 0 |
| 0 | 0 | 1 | 2 | 3 | 4 | 5 | 4 | 3 | 2 | 1 | 0 | 0 | 0 | 0 |
| 0 | 0 | 1 | 2 | 3 | 4 | 5 | 4 | 3 | 2 | 1 | 0 | 0 | 0 | 0 |
| 0 | 0 | 1 | 2 | 3 | 4 | 5 | 4 | 3 | 2 | 1 | 0 | 0 | 0 | 0 |
| 0 | 0 | 1 | 2 | 3 | 4 | ■ | 4 | 3 | 2 | 1 | 0 | 0 | 0 | 0 |
| 0 | 0 | 1 | 2 | 3 | 4 | 5 | 4 | 3 | 2 | 1 | 0 | 0 | 0 | 0 |
| 0 | 0 | 1 | 2 | 3 | 4 | 5 | 4 | 3 | 2 | 1 | 0 | 0 | 0 | 0 |
| 0 | 0 | 1 | 2 | 3 | 4 | 5 | 4 | 3 | 2 | 1 | 0 | 0 | 0 | 0 |
| 0 | 0 | 1 | 2 | 3 | 4 | 5 | 4 | 3 | 2 | 1 | 0 | 0 | 0 | 0 |
| 0 | 0 | 0 | 0 | 0 | 0 | 0 | 0 | 0 | 0 | 0 | 0 | 0 | 0 | 0 |

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 1 | 2 | 3 | 4 | 5 | 4 | 3 | 2 | 1 | 0 |
| 0 | 0 | 0 | 0 | 0 | 1 | 2 | 3 | 4 | 5 | 4 | 3 | 2 | 1 | 0 |
| 0 | 0 | 0 | 0 | 0 | 1 | 2 | 3 | 4 | 5 | 4 | 3 | 2 | 1 | 0 |
| 0 | 0 | 0 | 0 | 0 | 1 | 2 | 3 | 4 | 5 | 4 | 3 | 2 | 1 | 0 |
| 0 | 0 | 0 | 0 | 0 | 1 | 2 | 3 | 4 | ■ | 4 | 3 | 2 | 1 | 0 |
| 0 | 0 | 0 | 0 | 0 | 1 | 2 | 3 | 4 | 5 | 4 | 3 | 2 | 1 | 0 |
| 0 | 0 | 0 | 0 | 0 | 1 | 2 | 3 | 4 | 5 | 4 | 3 | 2 | 1 | 0 |
| 0 | 0 | 0 | 0 | 0 | 1 | 2 | 3 | 4 | 5 | 4 | 3 | 2 | 1 | 0 |
| 0 | 0 | 0 | 0 | 0 | 1 | 2 | 3 | 4 | 5 | 4 | 3 | 2 | 1 | 0 |
| 0 | 0 | 0 | 0 | 0 | 0 | 0 | 0 | 0 | 0 | 0 | 0 | 0 | 0 | 0 |

FIG. 3C

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 1 | 2 | 3 | 5 | 7 | 7 | 7 | 7 | 5 | 3 | 2 | 1 | 0 | 0 |
| 0 | 0 | 1 | 2 | 3 | 5 | 7 | 7 | 7 | 7 | 5 | 3 | 2 | 1 | 0 | 0 |
| 0 | 0 | 1 | 2 | 3 | 5 | 7 | 7 | 7 | 7 | 5 | 3 | 2 | 1 | 0 | 0 |
| 0 | 0 | 1 | 2 | 3 | 5 | 7 | 7 | 7 | 7 | 5 | 3 | 2 | 1 | 0 | 0 |
| 0 | 0 | 1 | 2 | 3 | 5 | 7 | 7 | 7 | 7 | 5 | 3 | 2 | 1 | 0 | 0 |
| 0 | 0 | 1 | 2 | 3 | 5 | 7 | 7 | 7 | 7 | 5 | 3 | 2 | 1 | 0 | 0 |
| 0 | 0 | 1 | 2 | 3 | 5 | 7 | 7 | 7 | 7 | 5 | 3 | 2 | 1 | 0 | 0 |
| 0 | 0 | 1 | 2 | 3 | 5 | 7 | 7 | 7 | 7 | 5 | 3 | 2 | 1 | 0 | 0 |
| 0 | 0 | 1 | 2 | 3 | 5 | 7 | 7 | 7 | 7 | 5 | 3 | 2 | 1 | 0 | 0 |
| 0 | 0 | 0 | 0 | 0 | 0 | 0 | 0 | 0 | 0 | 0 | 0 | 0 | 0 | 0 | 0 |

FINGER ACTIVATED REDUCED KEYBOARD AND A METHOD FOR PERFORMING TEXT INPUT

RELATED APPLICATIONS

This application is a continuation in part of U.S. provisional patent application Ser. No. U.S. 60/645,965 filed on Jan. 24, 2005, which clam the benefit and priority from U.S. provisional patent application Ser. No. 60/599,216 filed on Aug. 6, 2004, each of which are incorporated herein by reference in its entirety.

FIELD OF THE INVENTION

The present invention relates generally to mobile and handheld electronic devices and more specifically, to a reduced keyboard activated preferably by thumbs and fingers designed to be integrated into small electronic handheld devices employing text input and a method for entering the text input

BACKGROUND OF THE INVENTION

Over the recent years, computer hardware has become progressively smaller. Current hand-held computerized and communications devices are small so that they can be comfortably held in one's pocket. Most widely-used small-sized devices, such as personal data assistants (PDAs), smart phones, Tablet PC's, wrist watches, car navigating systems and the like are today routinely provided with communications and computing capabilities. One drawback of size miniaturization is the failure to provide efficient text input means. The specific device limiting further miniaturization and enhanced utilization of handheld devices is the keyboard. Since the keyboard is the main input unit used by practically all computing devices the size limitation enforced on the keyboard by the small size of the host device is a serious drawback. Furthermore, the limited size of the keyboards on small-sized devices makes finger-based or thumb-based input problematic. In order to alleviate the problem various artificial input devices, such as a stylus or a pen, are typically used making the input process physically awkward, unnatural, error-prone, and considerably slower than finger-based input.

Alternative input technologies, such as voice interfaces are being continuously developed, but such techniques are still inaccurate, do not provide privacy in public places and work with difficulties in noisy environments. The text input systems available today on handheld devices prevent the full use of keyboard applications such as mobile e-mail and mobile word-processing. As a result, at present, mobile communication is limited to voice applications and substantially limited text input systems, such as SMS.

U.S. Pat. No. 6,801,190 entitled "Keyboard system with automatic correction" describes a mini-QWERTY keyboard. The keyboard is designed to correct inaccuracies in keyboard entries. This patent is mainly directed towards single-point entries. The engine metric is well known and is based on the sum of the distances between the contact points and the known coordinates of a character or a plurality of characters on the keyboard. Although the patent mentions incidentally the possible use of a finger in order to input data, the keyboard system layout and engine are clearly not adapted to finger input. The input resulting from a thumb can be easily too scattered to belong only to the "auto-correcting keyboard area" (the part of the keyboard containing the letters). It may then touch other keyboard regions such as the space key or any other function or punctuation, leading to fatal misinterpretations. In fact, a letter interpreted as a disambiguation key (such as the space key) will lead to a premature disambiguation and therefore will leave almost no chance for a correct disambiguating process to happen. Likewise, a disambiguation key interpreted as a letter will lead to the same problem. In contrast to this reference, the present invention is based on a finger input represented by a cluster of points or a surface. In addition, the keyboard layout of the present invention is designed to prevent ambiguities between the letters region and the remaining parts of the keyboard. Finally, the system metric is based on density distribution instead of distance between points.

Keyboards using multiple-letter keys and equipped with a disambiguation system are not new. The system called T9 and based on U.S. Pat. No. 6,307,548, is well known and it is included in almost all cellular phones today. The keyboard is composed of 8 keys containing a plurality of letters. Each letter is input by a single keystroke. A disambiguation process provides the most likely output. The above patent quotes many other patents dealing with reduced keyboards. This patent and all the above patents, refer to keyboard systems with a fixed number of predefined characters per key. None of them disclose dynamic keys. Instead of considering keys, the present invention works with keyboard regions. The plurality of letters for each keystroke depends on the magnitude of the input area and the letters that may be associated together in a given keystroke vary. The difference between these inventions and the present one is crucial since, in the present invention, the user activates a region surrounding a character instead of aiming at a single small key.

U.S. Pat. No. 5,952,942 refers to a "Method and device for input of text messages from a keypad". This method refers to the use of a classical phone keypad in which each key represents up to 4 characters. A new object is created each time a keystroke representing a set of candidate characters is added to a previous object ("old object"). The previous object may contain several candidates that are words or beginnings of words (word-stems). At the stage of the formation of the new object, a matching process is activated. All the possible combinations of letters resulting from the addition of the last keystroke to one of the old object candidates are matched with the dictionary in order to check the existence of a word or the beginning of a word belonging to the dictionary. As seen, this process is repeated for each keystroke. To each new object, the non-rejected sequences are the ones that are words or can lead to future words (word-stems). The elimination is therefore sequential. In contrast to this reference, in the present invention, disambiguation is preferably executed only when the word is terminated. Furthermore, in the present invention, a parameter measuring the input accuracy is used in conjunction with the frequency of use in order to sort the solutions. In the present invention, the above parameter is obtained by summing relevant input densities.

U.S. Pat. No. 6,307,548 refers to a "Reduced keyboard disambiguating system". The principle of this keyboard relies on the fact that it is made of ambiguous keys, wherein each key contains a few letters or symbols. The patent describes a disambiguating process in which the system is equipped with a database ("dictionary") of 24,500 words organized in a tree structure. Each word belongs to a given node in the predetermined tree structure of the dictionary and can be accessed only through its parent node. In that system, each word is represented by a unique combination of keystrokes and each keystroke combination can correspond to a few words. Consequently, there is only one way to tap a given word, and when it is not input accurately, it cannot be correctly identified by the system The disambiguation engine can be represented by a one-to-many function. The structure of the dictionary is determined in advance. Each time a character is input, the search tree eliminates the combinations, which are not words or part of words (word-stem). This algorithm is not workable when the number of characters per key is dynamic since the structure of the dictionary is predetermined.

U.S. Pat. No. 6,556,841 refers to a spelling corrector system. This patent employs the use of a classical phone keypad, in which each key corresponds to 3 or 4 letters. The selection of one of the letters belonging to a key is reached by tapping one or several times the corresponding key (each tap leads to the display of a subsequent letter of the key). The purpose of this patent is to take into account the possibility that the user may have, while inputting a word, tapped a key with an inaccurate number of occurrences, leading to an incorrect selection of the letter. The method used in this patent is to check whether the user has written words belonging to a given dictionary, and in case they do not, propose alternative solutions. These solutions must belong to the dictionary and have the same combination of keys (only the multiple tapping on a given key may be incorrect). The disambiguation process begins when a termination symbol is tapped at the end of a word. In case the word does not belong to the dictionary, it replaces successively each letter of the word with one of the letters belonging to the same key. Each word resulting from this transformation is matched with the dictionary. Alternatives belonging to the dictionary are proposed to the user. The algorithm employed is based on the combinatory of all the possible words created by a sequence of keystrokes. In contrast to this patent, in the present invention the disambiguation is preferably performed by elimination of all the words whose letters do not satisfy the sequence of keystrokes. The referenced invention does not correct an error on the keys location but only an error on the number of keystrokes on a given key. There is no possibility of using a matching parameter measuring the input accuracy in order to sort the candidates (in case of multiple solutions). By its very definition, the referenced invention refers to keypads or keyboards with a predefined number of characters per key and is therefore not adapted for dynamic disambiguation.

There is therefore a need for high-speed, natural and accurate text input systems having a compact keyboard area and automatic input disambiguating capabilities to be applicable for the known keyboard layouts. Such a text-input system will make easily available e-mail, instant messaging and word processing on Tablet PC's, PDAs, wrist watches, car dashboard systems, smart and cellular phones, and the like. In order to make such a keyboard popular, the keyboard will be of a miniature size to provide the option of fitting such a keyboard into handheld devices having the smallest dimensions. In addition, the layout has to be intuitively designed, such as for example, the QWERTY layout design, and the input has to be performed via the utilization of two thumbs or fingers In order to negate the need for using artificial input devices such as a stylus or a pen.

SUMMARY OF THE INVENTION

This present invention regards providing users of handheld devices with a natural and intuitive keyboard, enabling fast and comfortable text input for applications when the keyboard is substantially reduced in size. Ideally, the keyboard is activated using human fingers, such as two thumbs.

A first aspect of the present invention regards a reduced keyboard apparatus for text input devices. The apparatus comprises a keyboard adapted for displaying letters and characterized by having no discrete boundary between the letters. The keyboard is further adapted for enabling input of a word by a succession of keystrokes on the keyboard, wherein a single keystroke on the keyboard activates a keyboard region defined according to specific characteristics of the single keystroke and contains one or more letter candidates. The keyboard further comprises probability computing means for computing a probability value associated with letter candidate in the keyboard region, a dictionary having word classes categorized according to the first and last letters of the words of the dictionary, wherein the words are associated with frequency of use values, and word list generator means for producing a candidate word list derived from the word classes of the dictionary and for successively eliminating words in the candidate word list for providing a solution for the input word, wherein the means considers the probability value associated with the letter candidate, the number of keystrokes performed during input of a word, and a frequency of use value associated with the candidate word.

The second aspect of the present invention regards a method for performing text input on text input devices. The method comprises inputting a word through a keyboard adapted for displaying letters and characterized by having no discrete boundary between the letters, and adapted for enabling input of a word by a succession of keystrokes on the keyboard, wherein a keystroke on the keyboard activates a keyboard region defined according to highly specific characteristics of the keystroke and contains one or more letter candidates, computing a probability value associated with the letters candidate in the keyboard region, selecting classes of a dictionary, the dictionary comprising word classes categorized according to the firs and last letters of a word in dictionary to which an input word could belong to produce a candidate word list, and successively eliminating and sorting words in the candidate word list to provide a solution for the input word.

The present invention is based on a keyboard in which the symbols are not contained in keys having discrete boundaries. Instead, a sensitive area, which can be as large as desired, defines each symbol and consequently, symbol areas intersect. When a user touches a given area of the keyboard, the signal sent by the keyboard to the connected device is not necessarily a single character, but may correspond to a set of characters surrounding or located in the activated region. A disambiguating method allows resolving ambiguous keystroke sequences. Since the user is no longer limited by a key to tap a letter, but rather has to touch a region centered on the character he wants to tap, directional and target accuracy is not required, thus allowing for fast tapping using the thumbs or fingers on small keyboards. The detection of this area may be performed by any sensing technology, such as touch-screen technologies, the technology used in laptop track-pads or any other type of sensors, or a conventional mechanical keyboard when several keys are pressed at once. Thus, the present invention is suitable for small and very small devices. The user does not need to use a pen or other input device or pinpoint carefully at a key with his finger, but can rather tap in a generally inaccurate manner on the region where the target letter is located. As a result, the process of tapping becomes much easier and faster and allows the use of thumbs or fingers.

BRIEF DESCRIPTION OF THE DRAWINGS

The present invention will now be described in detail, by way of example only, with reference to the accompanying figures, wherein:

FIGS. 3A and 3B illustrate matrix density diagrams generated by two different input points, in accordance with the preferred embodiment of the present invention;

FIG. 3C illustrates a matrix density diagram generated by the two input points of FIGS. 3A and 3B, in accordance with the preferred embodiment of the present invention;

DETAILED DESCRIPTION OF THE PREFERRED EMBODIMENTS

Figure 1:
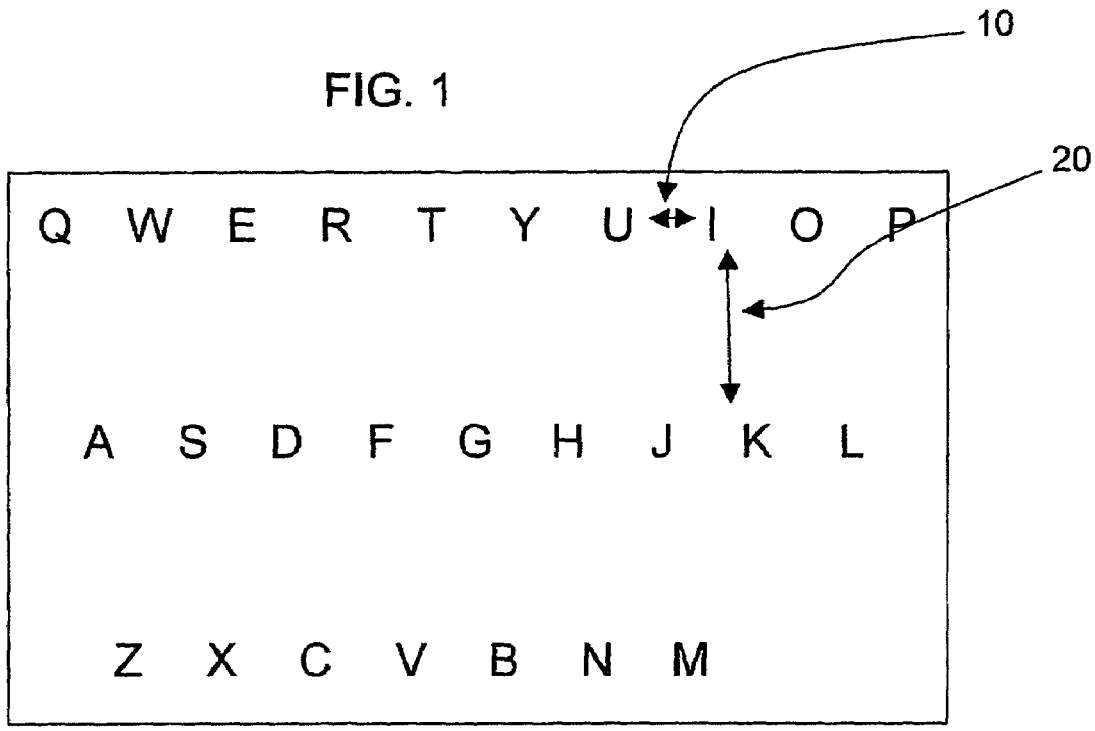
FIG. 1 illustrates a graphically simplified view of a QWERTY keyboard layout, in which letters are not located on discrete keys and there is a significant separation between rows, in accordance with the preferred embodiment of the present invention.

Reference will now be made in detail to the present preferred embodiments of the invention as illustrated in the accompanying drawings. The present invention provides a keyboard whose input is preferably performed using the fingers or the thumbs. Consequently, the user can easily use his two hands in parallel, ensuring a faster and more natural input that does not require any additional assistive device such as a pen or a stylus. The dimensions of the keyboard can be sufficiently reduced, such as to enable the fitting thereof into any small-sized handheld devices. Keyboards with the dimensions of about 3 cm×2.7 cm or less are very efficient. Commercially available mini-keyboards for PDAs require "hard-tapping" (i.e. the application of a relatively high degree of pressure on a key in order to activate said key). This feature minimizes the misinterpretation of the targeted key with one of its neighbors. As the thumb pressure on relatively small keyboards is scattered on several neighboring keys, the only way to select a single key among its pressed neighbors is obtained by triggering it with a "hard" pressure. However, this "hard tapping" slows down the tapping process. In contrast, the present invention does not require hard tapping. The keyboard of the present invention preferably comprises a touch-screen, flat membrane or other sensor technologies. When the device is equipped with a conventional mechanical keyboard, keys are to be set to respond to small pressure, allowing for fast tapping.

The keyboard comprises two main areas: a letter region and a functions and punctuation region. The letters region contains all the letters of the alphabet. In the English-language embodiment of the present invention, the keyboard layout utilized is highly intuitive, such as for example, the QWERTY layout. The present invention could also be adapted to other types of keyboard layouts, such as the DVORAK keyboard, Chiklet keyboard, and the like. Furthermore, the keyboard could be adapted to diverse other languages in the appropriate manner. In the English-language embodiment, the letter region contains only the 26 Latin characters arranged in three rows having 10, 9 and 7 characters respectively. Separation space between rows is preferably sufficient to minimize ambiguities between two adjacent but separate rows. The functions and punctuation region contains the most commonly used functions and punctuation symbols, such as delete, space, period, coma, and the like.

Considering the importance of the relative size of a thumb in comparison with a small keyboard, a keystroke might be easily interpreted by the apparatus and method as belonging to both of the above-described regions. Therefore, in the present invention, the two regions are physically sufficiently separated in order to avoid ambiguities. In addition, in cases when the input belongs to both regions, the apparatus selects the more likely of the two regions. When the user needs to input a special character, a new layout is provided, preferably by means of a shift key, an alternative key or the like, and the letter region is temporarily deactivated. This feature works for both mechanical and sensor technology keyboards, such as touch-screen and flat membrane keyboards.

Given a finger-activated input, the nature of the input as it is received by the apparatus of the present invention is either a cluster of points or a surface, depending on the technology employed, where both structures represent the contact of the finger on the keyboard. The input is then transformed by the apparatus and method into an input matrix having the letter region dimension in which each element is a pixel/point of the keyboard, whose value is computed according to the input distribution and named local density. The local density is positive and it is used to define an input surface. Thus, each keyboard pixel having a density equal to zero does not belong to the generated input area.

The three rows of the QWERTY letter region are preferably meaningfully separated. When all the pixels of the above input area belong to a single row of letters, only the letters of this row can be letter candidates where letter candidates refer to possible letters corresponding to the intended letter of input for a given keystroke. When the input area intersects with two rows, two coefficients proportional to the intersection between the input area and the area corresponding to each row are computed. Each letter of the selected line generates a candidate matrix. The candidate matrix is generated from the above input matrix, by modifying the local densities. The modification is applied only on those pixels whose value is not 0 in the input matrix. The new local density of the candidate matrix is the sum of the former input density matrix with a value reflecting the horizontal distance between the pixel and the candidate letter. The closer a point/pixel is from a given letter, the greater the corresponding value. When the point/pixel is far, its density can be negative. When the input area intersects with two rows, two coefficients proportional to the intersection between the input area and the area corresponding to each row are computed. The purpose of those coefficients is to determine the relative significance of each row. The measure of the relevancy of a given candidate letter considering a given keystroke is a number equal to the sum of the values of all the elements of the corresponding candidate matrix. This number can be negative. Therefore, each given keystroke is associated with one or several numbers measuring the likelihood of various candidate letters to be the user's choice.

Note should be taken that the proposed apparatus and method are not based on character recognition but rather on word recognition. When the user finishes inputting a word and taps the space key or any punctuation key, or a key signaling the end of the letters selection for the desired word by the user, a word disambiguation process is activated. The disambiguation process considers the entire set of keystrokes and candidate letters for each keystroke to determine candidate words. The apparatus of the present invention will preferably provide a dictionary of about 50,000 or more inflected words. At first, a primary filtering process takes into account elements such as the number of keystrokes and intermediate candidate letters in order to determine a reduced list of candidate words. For each word of the candidate word list, a matching grade is computed on the basis of the above candidate letter relevancy numbers. The final word relevancy grade is obtained by taking into account the above matching grade as well as the candidate word frequency of use. Candidate words are sorted according to the above grades. The first candidate selection is automatically displayed on the editor. The user can select alternate solutions from a secondary choices list when the first choice does not correspond to the word that was intended to be input.

The proposed apparatus and method of the present invention will be presented in detail via two preferred embodiments. It would be readily appreciated that other preferred embodiments are possible, which fall under the scope of the present invention, as are set out in the appended claims.

The first preferred embodiment of the present invention regards a small keyboard having a QWERTY layout. The keyboard is operated on and activated using two thumbs or fingers. The keyboard is substantially small with dimensions of about 3 cm×2.7 cm as it is designed mainly for integration into small-sized devices such as cellular or smart phones, small PDAs and the like. In such devices, the keyboard-size-limiting dimension component is the keyboard width, which cannot be bigger than the width of a typical cellular phone or PDA Consequently, the thumb being bigger than the area corresponding to a single character, each keystroke activated by a thumb touches multiple characters, leading to ambiguities where "ambiguity" refers to an uncertainty in the identity of an input letter or word. The efficient disambiguation process based on dynamic keyboard areas disambiguates the input word following completion of its input. Thus, a user working with a keyboard proposed by the present invention can tap intuitively on the keyboard and obtain in a substantially large number of cases an output precise enough to correspond to what he intended to input.

Referring now to FIG. 1, in order to reduce the number of ambiguities, it is preferable to set a meaningful distance 20 between two rows of letters. In that manner, a single keystroke will most likely trigger only characters belonging to a single row. This can be achieved when the distance between two rows is greater than about 1 cm. Space of this size is compatible with the smallest handheld devices. Since the horizontal discrimination 10 between two neighboring characters within a single row is about 3 mm or less, the vertical discrimination is at least about three times greater than the horizontal one. When input points activate two different rows, a coefficient of probability is computed and the row having the greatest input area is advantaged with respect to the other row. The keyboard in all its configurations, such as touch screen, mechanical or any other can have various layouts, which are activated by a "shift" mode. Characters belonging to the chosen mode are activated and displayed to the user while the remaining characters are not activated and remain hidden. Between modes, the characters' size and position may differ.

Figure 2A:
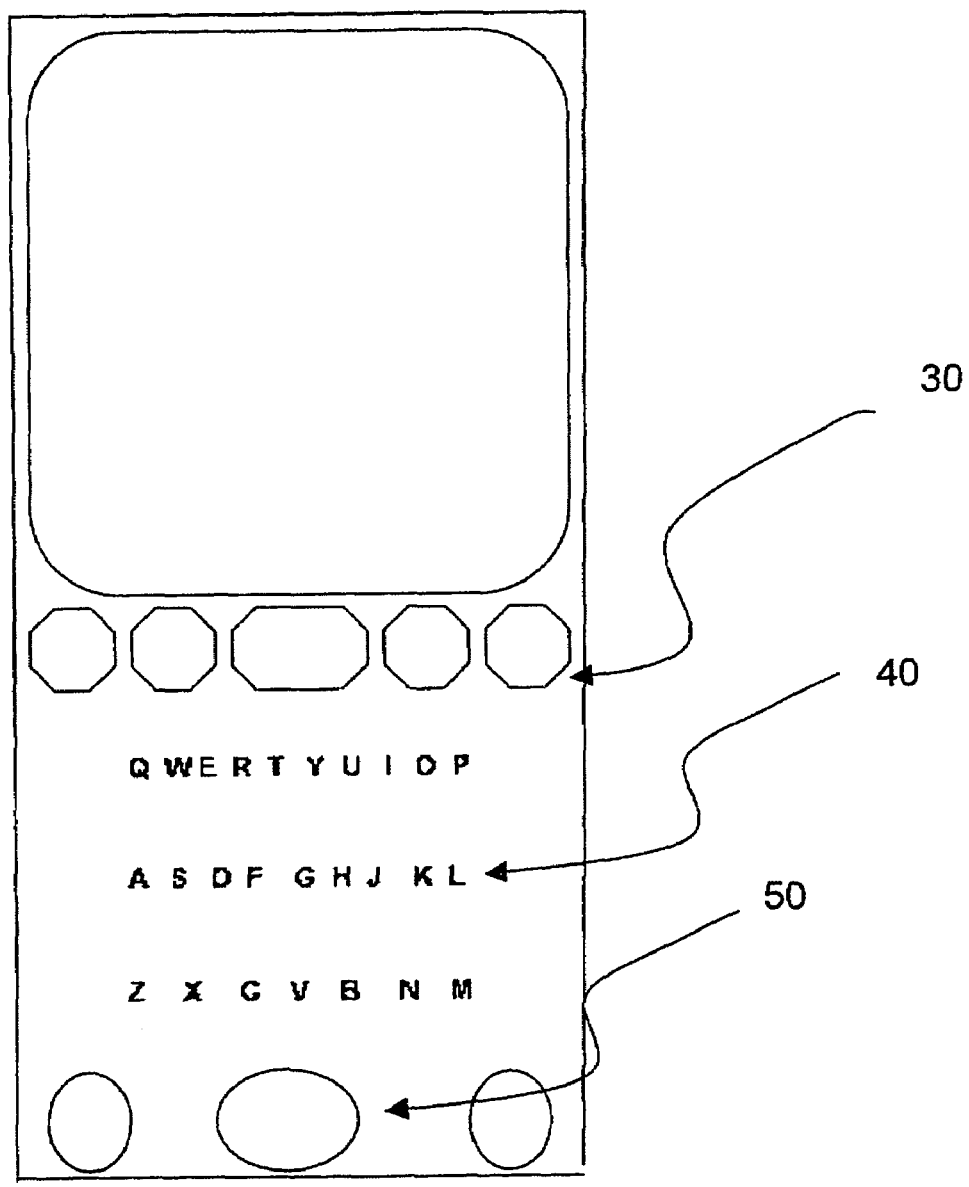
FIGS. 2A, 2B, 2C and 2D each illustrate a different layout mode of a hand-held computing device employing the method of the present invention, in accordance with the preferred embodiment of the present invention.

Referring now to FIG. 2A that shows the letters region layout. The drawing illustrates a handheld computing device with a QWERTY layout 40, the space key 50 and the shift key 30. The shift key 30 enable switching from mode to mode. Those keys are located sufficiently far from the letter keys in order to avoid ambiguities. It would be easily understood that many other layout shapes are possible, such as chord concave, convex, or the like, which fall under the scope of the present invention.

Figure 2B:
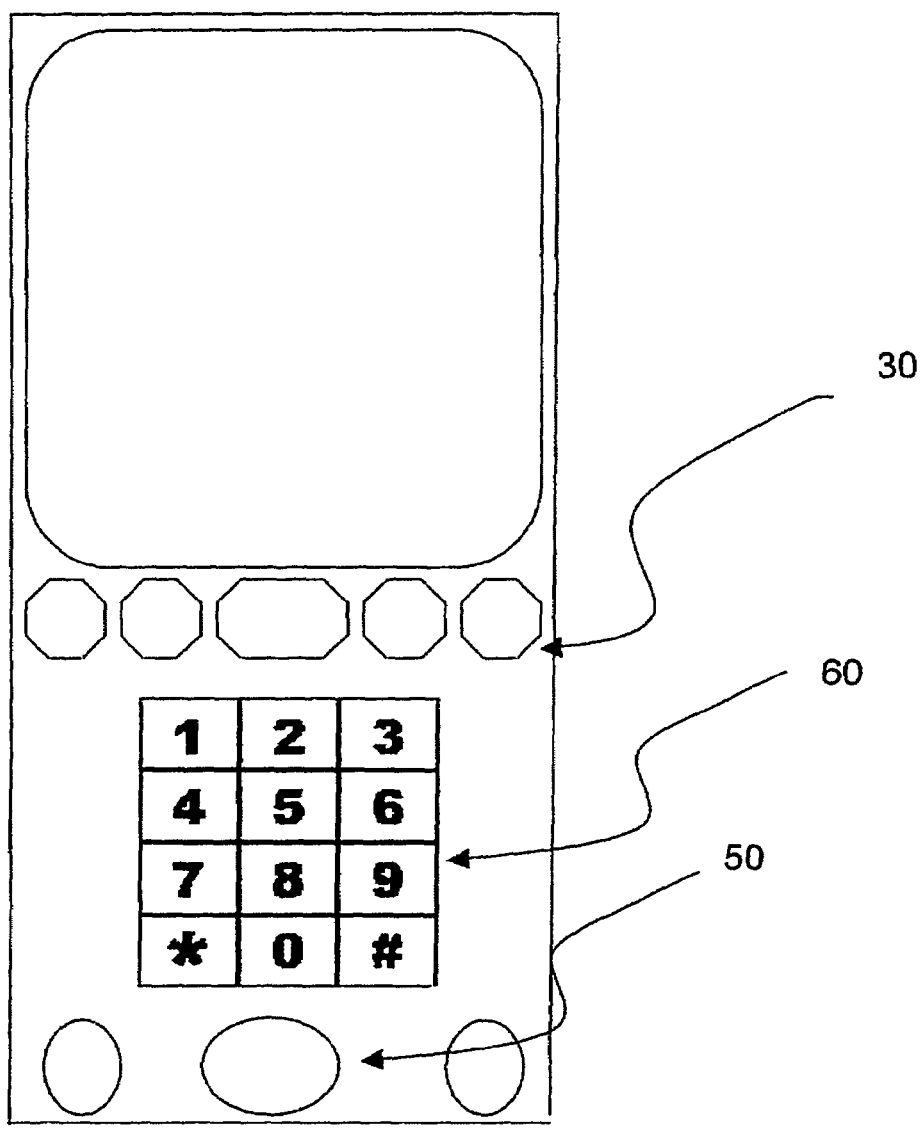

Referring now to FIG. 2B that shows the numeric layout. The drawing illustrates a handheld computing device with numeric layout 60, the space key 50 and the shift key 30. Note should be taken that since the number of digits is naturally less than the number of letters, the area corresponding to the numbers has a better resolution than its letter region counterpart and thus the keys are large enough to avoid ambiguities. However, when the input area crosses two neighboring keys, the key having the larger intersection area is selected.

Figure 2C:
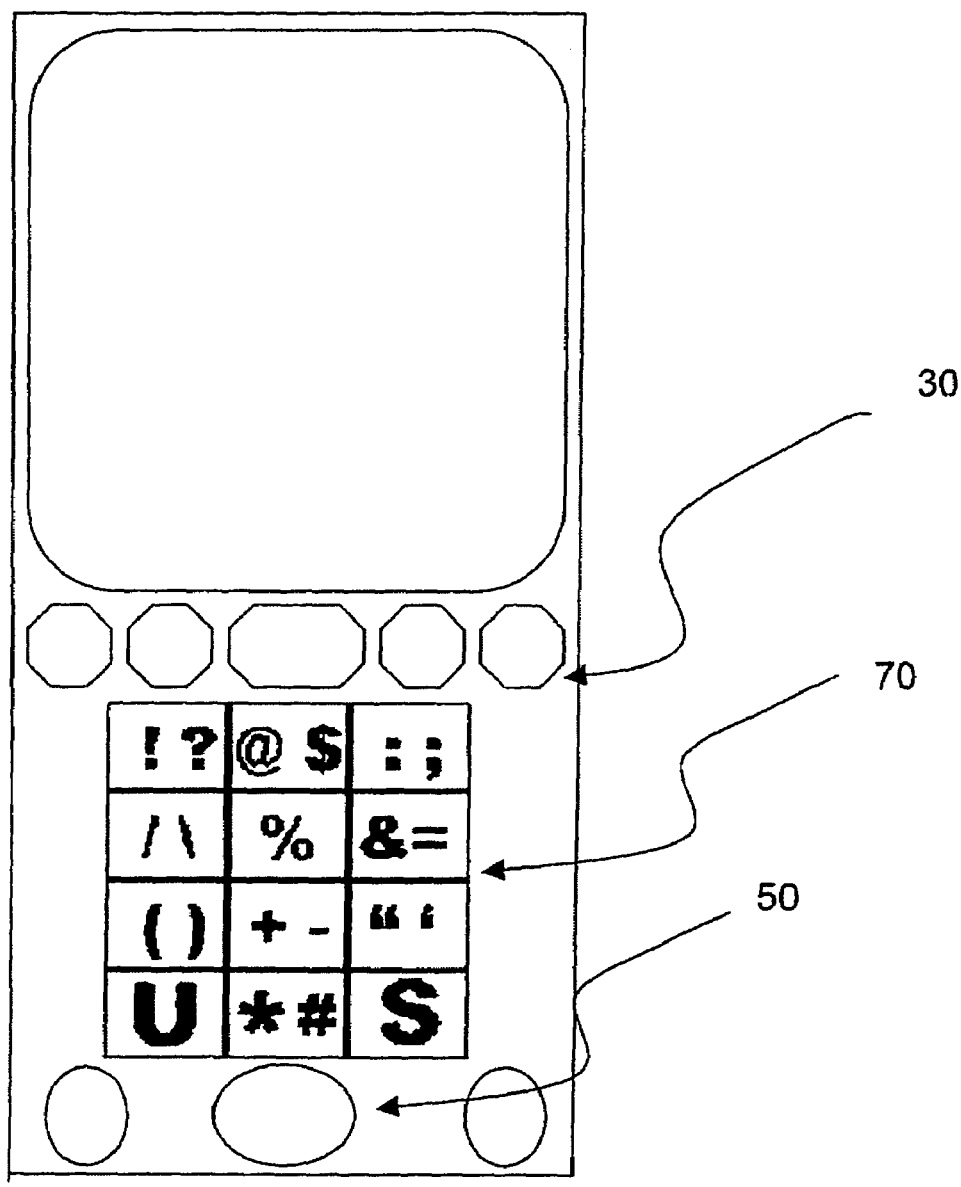

FIG. 2C shows the special character layout. Each key has the same area as in FIG. 2B and represents two characters. When a key is activated, the section of a character depends on the period of the elapsed time. When the input time is shorter than about one second, the left character is selected and displayed; otherwise the right character is selected and displayed. Preferably, the "U" key is used to add a new word to the dictionary and the "S" key is used to suppress a word from the dictionary. The period of the elapsed time could differ in other possible embodiments.

Figure 2D:
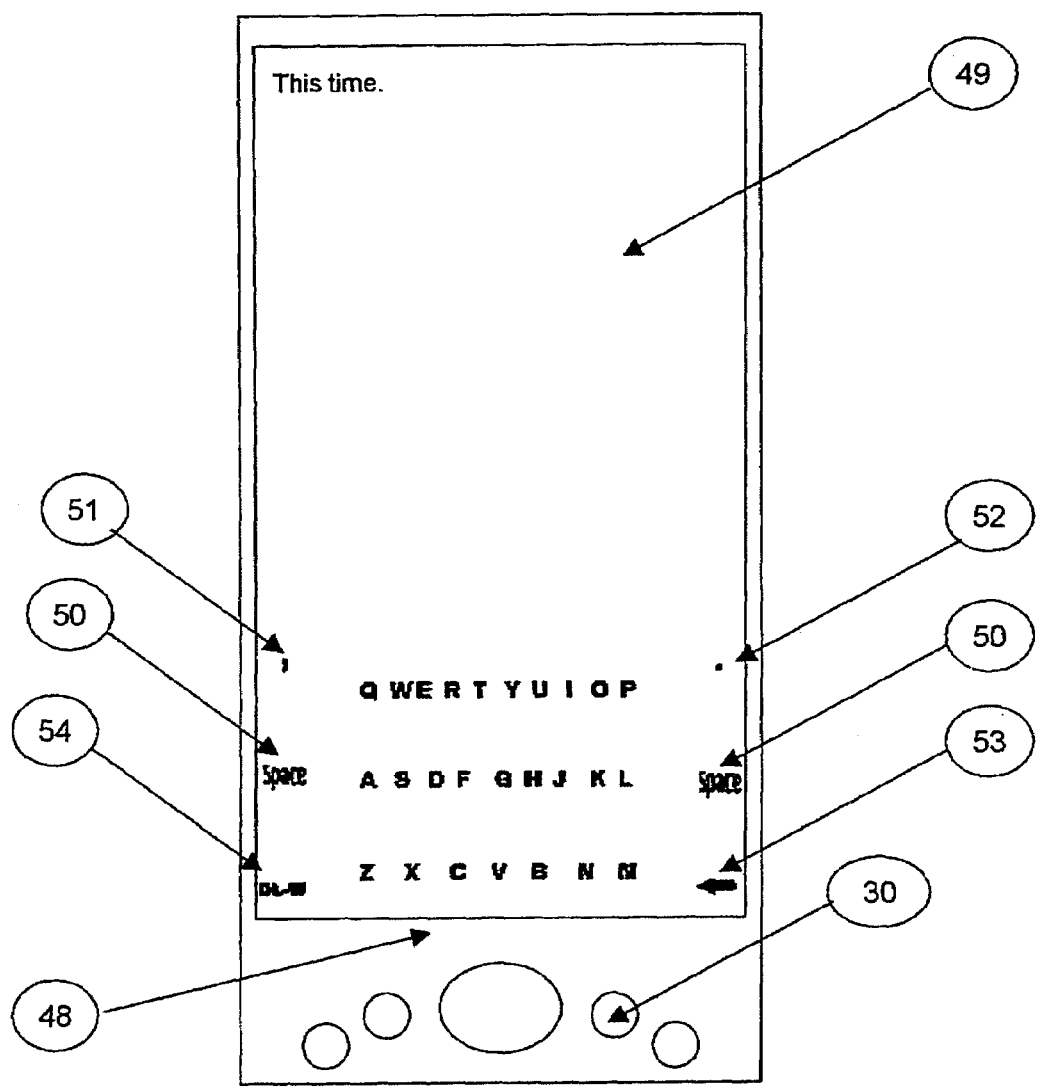

Referring now to FIG. 2D that shows another letter region layout on a touch screen display device, the space keys 50, the coma key 51, the dot key 52, the back space key 53 and the delete last word key 54 are located on the touch screen area 49 and are spatially distant from the letter region. The shift key 30 is a hard key which is not located on the touch screen area but on the hard keys region 48. This arrangement allows fast tapping using two thumbs. When the user needs a special character or to choose secondary choices then the hard keys could be used.

Referring now to FIGS. 3A, 3B, and 3C, the process of selecting letters given a keystroke will be described. The nature of input depends on the nature of the keyboard, such as touch-screen, flat membrane, mechanical keyboard, or the like, and on the tool used for input, such as a finger, a stylus, or the like. Input may be described by a point or a pixel, a continuous area or a stain, or a cluster of points or pixels. All the relevant input types are transformed by the apparatus and method into an input area. Two different possible input types operated by two different input engines are proposed. The first preferred input type is based on an input area for which each pixel or point is provided with a density value and none of the 26 letters has defined boundaries. The second input type is based on homogenous input area in which the letters of the keyboard are included in finite areas.

The first input type and input engine providing the disambiguation process will now be described, in which different types of input will be considered. The first input type is a cluster of points. A cluster of points is an input made up of one or more points. FIGS. 3A and 3B illustrate the matrix or area generated by single input points 80 and 90 and FIG. 3C illustrates a matrix generated by the two above input points. Each input point generates in its surroundings a square area for which each pixel is associated with a density value. This density value is maximal at that input point and its value at that point is referred to symbolically as MAX-DENSITY. The density value of each pixel decreases as a function of the horizontal distance between the pixel and the input point. The vertical distance between a pixel and the input point does not affect the density, and therefore, all squares in the same column have the same MAX-DENSITY value (except zero). For example, if the input point maximal density is 40, its coordinates (x0, y0), and a pixel coordinates (x0−3, y0+5), the pixel density produced by this input point will be: 40−3*STEP where STEP refers to the value associated with one pixel horizontal shift. The maximum density value is normalized as a function of the number of input points referred to symbolically as NI and the width of the letters keyboard layout referred to symbolically as NW according to the following equation:

MAX-DENSITY=$NW/4NI$

To provide an illustrative example, if NW equals 160 pixels and NI equals one, then the maximum density generated by a single input point (MAX-DENSITY) is 40. If NI equals 2 then MAX-DENSITY is 20. When a pixel density is zero or is negative, this pixel does not belong to the input area and its value becomes zero. Consequently, the area generated by a single input point is a square having sides of 2(MAX-DENSITY)/STEP pixels. The horizontal step is normalized as a function of the number of input points according to the following equation:

STEP=Constant/$NI$

Figure 4:
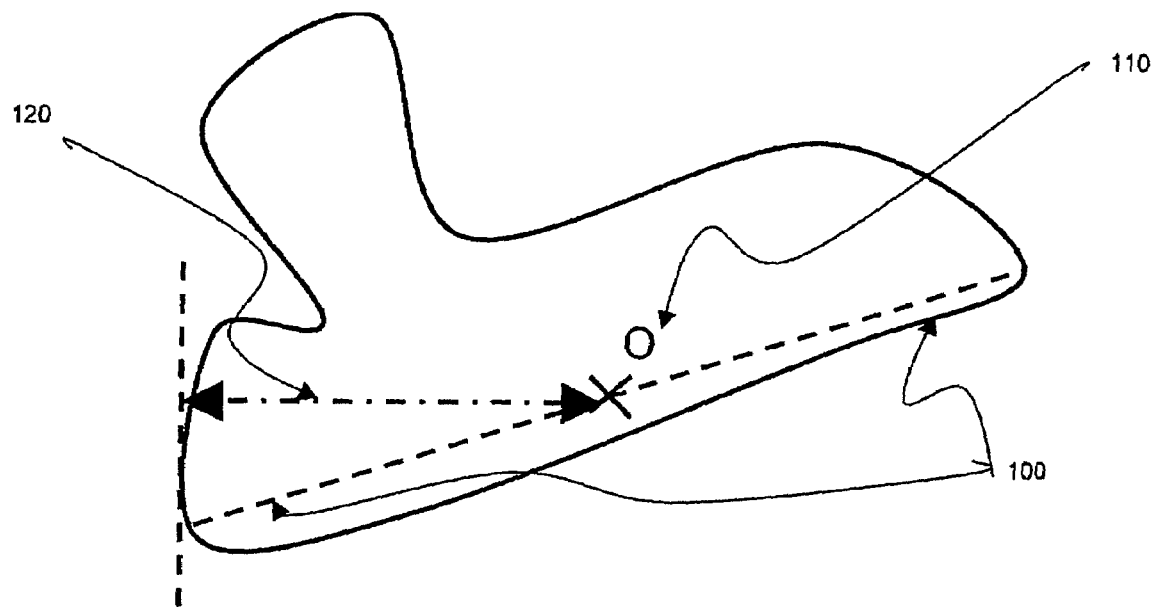
FIG. 4 illustrates a stain input and a method for computing pixel density, in accordance with the preferred embodiment of the present invention.

Referring now to FIG. 4 the second input type and input engine are described. The secondary input type is a stain (also referred to as a continuous area). The stain area is the input area, but the density value of the pixels is unknown. In order to obtain the density value of each pixel contained in the stain area, the larger segment between two points belonging to the perimeter of the stain 100 is determined. Point O is the middle of the segment 110. From point O, all the horizontal distances with points belonging to the periphery of the stain are computed and the maximum distance is stored. Reference 120 illustrates this maximum horizontal distance. Point O is defined as having a maximum density among all the points contained in the stain area. Its value is set to be equal to the above-mentioned maxim horizontal distance. From point O, the density of each pixel belonging to the stain area is computed in a similar manner since it is done when the input is a cluster of points where the density decreases gradually with the horizontal distance from point O. Consequently, all the pixels belonging to the stain area are provided with a positive density.

When the stain belongs to two different lines, the computation is a two-step process. A mechanical key is considered as one input pixel located at the center of the key. The computation is equivalent to the computation shown by FIG. 3A. When more than one key is pressed, each key generates an area, as described herein above in the case of a cluster of points. In such a case, each of the coordinates of the input cluster points corresponds to the center of the activated keys.

At this stage, a complete separation between rows is performed. When the pixels of the input area are contained in a single row, only the letters belonging to this row are considered as letter candidates. The determination of the candidate in this row is computed by taking into account the horizontal distance between the abscissa of the input pixels and of the candidate letters abscissa. The ordinates do not interfere in the computation. When n1 pixels of the input area belong to a given row and n2 pixels to a neighboring row, the computation is a two-step process. The first step takes into account only the n1 pixels and computes the letter candidates probability within this row as if n2 were equal to zero. The second step takes into account only the n2 pixels and computes the candidates' probability of the other row as if n1 were equal to zero. For each candidate of the two above adjacent rows a coefficient is assigned. For the row corresponding to the n1 pixels, the coefficient is n1/(n1+n2); for the other row it is n2/(n1+n2). Cases where three rows are activated are considered as a mistake and the two adjacent rows having the greater number of pixels are the only rows that are taken into consideration.

Next a detailed description of the computation of the relative probability or matching distance for a letter candidate, given a selected row, will be provided. For each letter belonging to a given row, a matrix is computed. Those matrices are all generated from the input matrix defined above and from the letter abscissa $XG_j$. Given a layout, the abscissas (and also the ordinates) of the letters are known. Therefore there may be 10, (j∈[1, 10]), 9 (j∈[11, 19]) or 7 (j∈[20, 26]) matrices according to the activated row, j is the corresponding index. The matrix corresponding to a letter is computed as follows. Each element (pixel) equal to zero in the input matrix remains unchanged in the candidate letter matrix. Each element (pixel) having a density d1 in the input matrix different from zero has a new density d and is computed according to the following equation:

$d_{ij} = d1_i + (NW/4 - \text{Absolute Value}(x_i - XG_j))$ if $d1_i \neq 0$ then
$d_{ij} = 0$ where i is the index of the input pixel, and j is the index of the candidate letter. NW is defined above and $XG_j$ is the candidate letter abscissa and $x_i$ is the abscissa of the pixel. It is noted that $d_{ij}$ can be negative when the corresponding pixel has its abscissa located far away from the candidate letter abscissa. The parameter measuring the distance between a candidate letter and the input is given by the algebraic sum of the densities of the corresponding matrix:

$$D_j = \sum_{i=1}^{m} d_{ij}$$

where index j corresponds to the candidate word letter and m is the number of pixels of the input area having a density different from zero. The resulting distances are then sorted and all the letters having a $D_j$ positive value are considered to be candidates in addition to the first letter having a negative density.

The description of the filtering process, which selects a list of words, which are candidates for a set of input keystrokes, will be described herein under. Next the detailed description of the metric will be provided. The metric measures the matching distance of a candidate word belonging to the candidate word list. If n is the number of keystrokes, then n is also the number of letters composing the above list words. By definition, all the letters of a word belonging to the candidate word list must match with one of the candidate letters of the corresponding keystroke. Consequently, each of the n keystrokes is associated with a $D_i$ number. The weight or distance corresponding to a given word is the sum of the n densities $D_i$, divided by n:

$$WEIGHT = \left(\sum_{i=1}^{n} D_i\right)/n$$

The final matching distance, considering a dictionary word candidate is given by:

$$MATCH=Constant*IMAX^2/(FREQ*WEIGHT^2) \text{ with } IMAX=IRANK^3$$

The matching distances are arranged in increasing order, such that the lower the MATCH value corresponding to a given word, the greater the likelihood for the specific word to be a solution FREQ is the frequency of use of the specific candidate word. Each word of the dictionary is provided with a given frequency. IRANK corresponds to a maximum local distortion considering all the letters in a given candidate word. Given a word candidate, each letter corresponds to a keystroke associated with candidate letters. The local rank is the index of the candidate word letter within the keystroke candidate letters list. As an example, supposing the word candidate is "car", and supposing that the list of candidate letters corresponding to the fist keystroke is "x", "v", "c" and "b". The local rank for the letter "c" is 3. IRANK is the maximum integer considering all the keystrokes. There are many ways to define IRANK, which fall in the scope of the present invention. IRANK can be computed also as a real number: Suppose we have for a given keystroke n positives densities in decreasing order $(D_1, D_2 \ldots D_i \ldots D_n)$, IRANK corresponding to the $j^{th}$ keystroke can be given by:

$$IRANK_j=Constant(D_1)/D_j, \text{ or } IRANK_j=Constant (D_1-D_j)/D_1 \text{ or } IRANK_j=Constant (D_1-D_j)/WEIGHT, \text{ etc.}$$

The matching is computed with $WEIGHT^2$. A word with a low frequency of use has some chance of being the first choice candidate, even when another candidate has a much greater frequency of use.

IMAX is a global parameter, which penalizes a match when a distortion is large. IMAX is by definition greater or equal to one. Statistically, it significantly improves the apparatus efficiency and therefore it is a highly useful parameter.

The following example illustrates the disambiguation engine. The user intends to input the word "FOR", tapping the following dynamic keyboard regions:

| Keystroke 1 | Keystroke 2 | Keystroke 3 |
|---|---|---|
| F | O (row 1) | T |
| G | I (row 1) | R |
| D | K (row 2) | Y |
| H | L (row 2) | E |

For each keystroke, the possible letters are arranged according to the magnitude of the density distribution as detailed herein above. For example, for keystroke 1, "F" is the best candidate letter. The list containing the first six word solutions is presented below. The computation for the final grade for each candidate is described in Table 1 below, where IRANK s a real number: $IRANK=MAX(D_1/D_i)$.

TABLE 1

Computation of Matching Distance for Candidate Words

| Word Candidates | Final Grade | Frequency of use | Weight | IRANK |
|---|---|---|---|---|
| for | 2 | 83336 | 835 | 1.035 |
| got | 51 | 5745 | 817 | 1.1 |
| fit | 852 | 334 | 816 | 1.09 |
| fly | 10288 | 202 | 589 | 1.37 |
| hot | 13471 | 885 | 704 | 1.94 |
| die | 16051 | 347 | 623 | 1.64 |

FIGS. 5A, 5B, 5C and 5D illustrate the input corresponding to the word "FOR", References 130, 140 and 150, respectively represent the keystrokes performed in order to generate the three letters of the word "FOR". When the user taps the first keystroke 130 the apparatus displays the character "F" 131 of FIG. 5A After the second keystroke 140, it displays character "O" 141 of FIG. 5B and after the third one 150, it displays the character "T" 151 of FIG. 5C. When a termination key is tapped (typically the SPACE key or any other such key indicating the word typing is complete), the word "FOT" disappears and the word "FOR" is displayed in the editor 161 of FIG. 5D and temporarily at the keyboard center 160 of FIG. 5D. In addition, a list containing alternative words: "got", "fit", "fly", "hot", and "die" 170 is also displayed. Eventually, the user can replace one of these choices with the selected word "FOR" by tapping a selection button, or if "FOR" is the default selection by moving to input the next word.

Figure 6A:
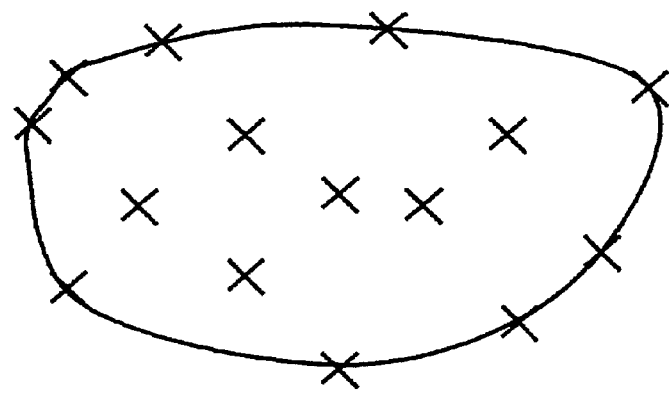
FIGS. 6A, 6B and 6C illustrate alternate cluster input diagrams and a method for converting input into continuous stain input, in accordance with preferred embodiments of the present invention.
Figure 6B:
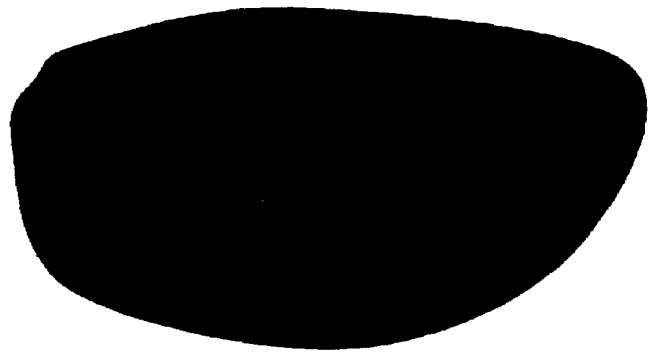
Figure 6C:

The second engine for the disambiguation process will now be described. The first case to be considered is when the input is an area. When the input is a cluster of points composed of three points or more, a closed line joining the external pixels is defined as shown in FIG. 6A. The pixels internal to the closed line define the input area, as illustrated by the blackened area in FIG. 6B. When the input is composed of a single point, a small sphere centered at this point defines the input area. When the input constitutes two points or more than two points that belong to the same line, then the input is a rectangle defined by the line joining the points with a small thickness as shown in FIG. 6C.

Figure 7A:
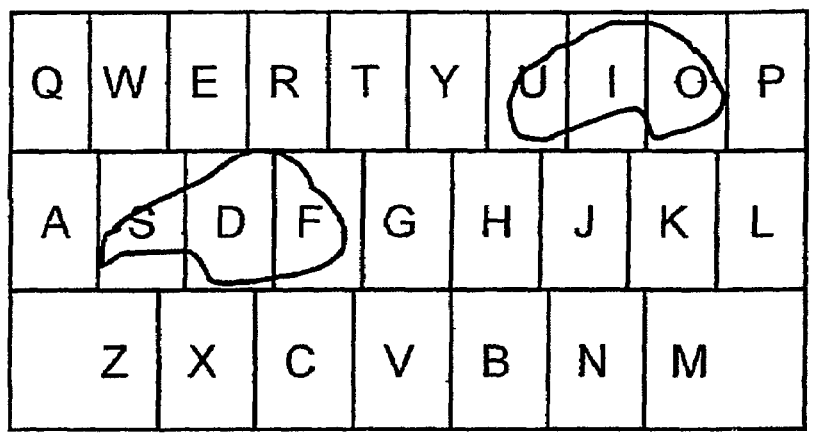
FIGS. 7A, 7B, 7C, 7D and 7E illustrate a word input using two keystrokes and a method using partial areas for computing the likelihood of each character belonging to the keystroke, in accordance with a preferred embodiment of the present invention.

When the input is a stain, the input area is defined as the stain area When the input is performed with mechanical keys, the input is an area defined by the keys triggered in a single keystroke. In all those cases, the input area can be artificially enlarged in order to allow a higher ambiguity level and therefore to obtain a greater number of candidate words. The enlargement of the input area can be provided as a predefined parameter by the user of the apparatus of the present invention. The keyboard letter region is preferably divided into 26 areas as shown in FIG. 7A. When the input area is contained in a single key letter area, the corresponding letter is the only candidate. When the input area belongs to a plurality of adjacent keys, a percentage is computed for each activated key. This percentage corresponds to a given letter and is equal to the sub-part of the input area, which belongs to the letter area divided by the input area. When an input area crosses two adjacent rows the same approach mentioned in the previous embodiment is used, namely, the area is divided into two areas each one belonging to a single row. The computation is done independently for each row with the corresponding subarea. At the end of the computation a coefficient equivalent to the one of the above engine is applied.

Figure 7B:
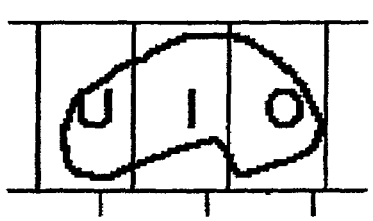
Figure 7C:
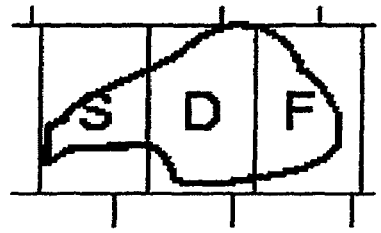
Figure 7D:
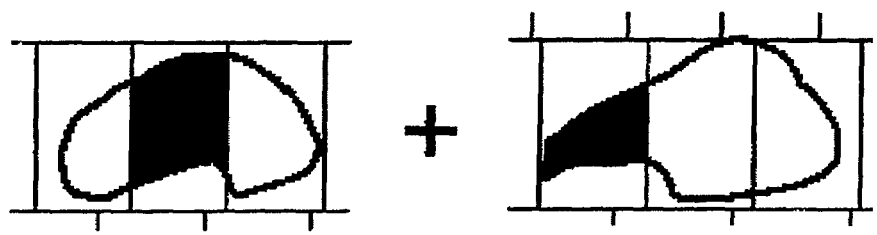
Figure 7E:
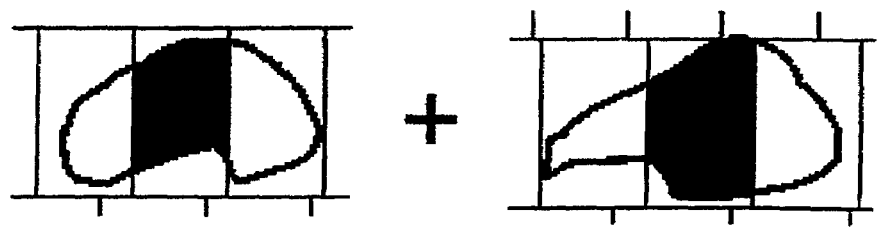

FIGS. 7A-7E illustrates a 2-keystroke sequence when the word "IS" is input. The weight is the summation of two areas: when "IS" is the word candidate the areas correspond to symbols "I" and "S". When "ID" is the word candidate the summation correspond to symbols "I" and "D". FIG. 7A illustrates the two areas covered by the input. FIG. 7B represents the area corresponding to the first keystroke, and FIG. 7C represents the area corresponding to the second keystroke. FIG. 7D represents the relevant areas when the candidate is "S". FIG. 7E represents the relevant areas when the candidate is "ID". The weight is the summation of all the local areas divided by n, and is given by the following equation:

$$\text{WEIGHT} = \left(\sum_{i=1}^{n} p_i\right)/n$$

where $p_i$ is the ratio between the size of the area corresponding to the intersection of the candidate letter key with the input surface and the size of the total input area and n is equal to the number of the letters of the word candidate (or the number of keystrokes). Alternatively, it is not necessary to perform the division by n since each word has the same number of letters. However, in embodiments where the number of keystrokes may not correspond to the exact number of candidate words letters, it is necessary to have a normalization process. The matching distance is the same as in the previous engine, and it is computed as follows:

MATCH=Constant*$IMAX^2$/(FREQ*$WEIGHT^2$) with $IMAX=IRANK^3$

Each time that the keyboard is used after an interruption greater than a few minutes, a slight calibration can be performed to enhance the performance of the apparatus of the present invention. The calibration stage is optional but recommended. The calibration is performed only on the abscissas and only for the first input words having high frequency of use and which are composed of more than three letters and which are not rejected by the user. For each letter of the above words, the shift in the horizontal direction which minimizes parameter IMAX/WEIGHT, is computed. This shift value is then applied as long as the keyboard is used without meaningful interruption. When such interruptions occur, the shift is reset to zero and the method performs a new shift based on the new words with high frequency. This process allows transparent multi-user calibration.

Two useful additional and optional built-in functions for the apparatus of the present invention, referred to as UPDATE and as SUPRESS, will be discussed next. UPDATE is a function allowing the introduction of new words into the dictionary. UPDATE is triggered when the user clicks or presses the 'U' key of FIG. 2C or any other such predefined key. The function is enabled only when the user has just clicked on a disambiguation key, or just after the tapping of a few keystrokes. The updated word is not the word displayed on the editor. It is the word corresponding to the sequence of the most probable letters of each keystroke 131 of FIG. 5A, 141 of FIGS. 5B and 151 of FIG. 5C). For example, in FIG. 5C, if the user performs an update, the updated word will be "FOT" and not "FOR". The apparatus performs a check as to the absence of this updated candidate word in the dictionary. SUPRESS is a function that allows for the deletion of words from the dictionary. The SUPRESS function is helpful when a non-useful word is often misinterpreted with another useful word. In that case, the user can decide to suppress the above unnecessary word. SUPRESS can be activated after the tapping of a diambiguation key and refers to the word displayed on the editor or alternatively pasted on the editor. The function provides for the checking of the existence of the word in the dictionary and a dialog box presented to the user in order to request confirmation regarding the user's intention to delete the word from the dictionary.

Figure 8:
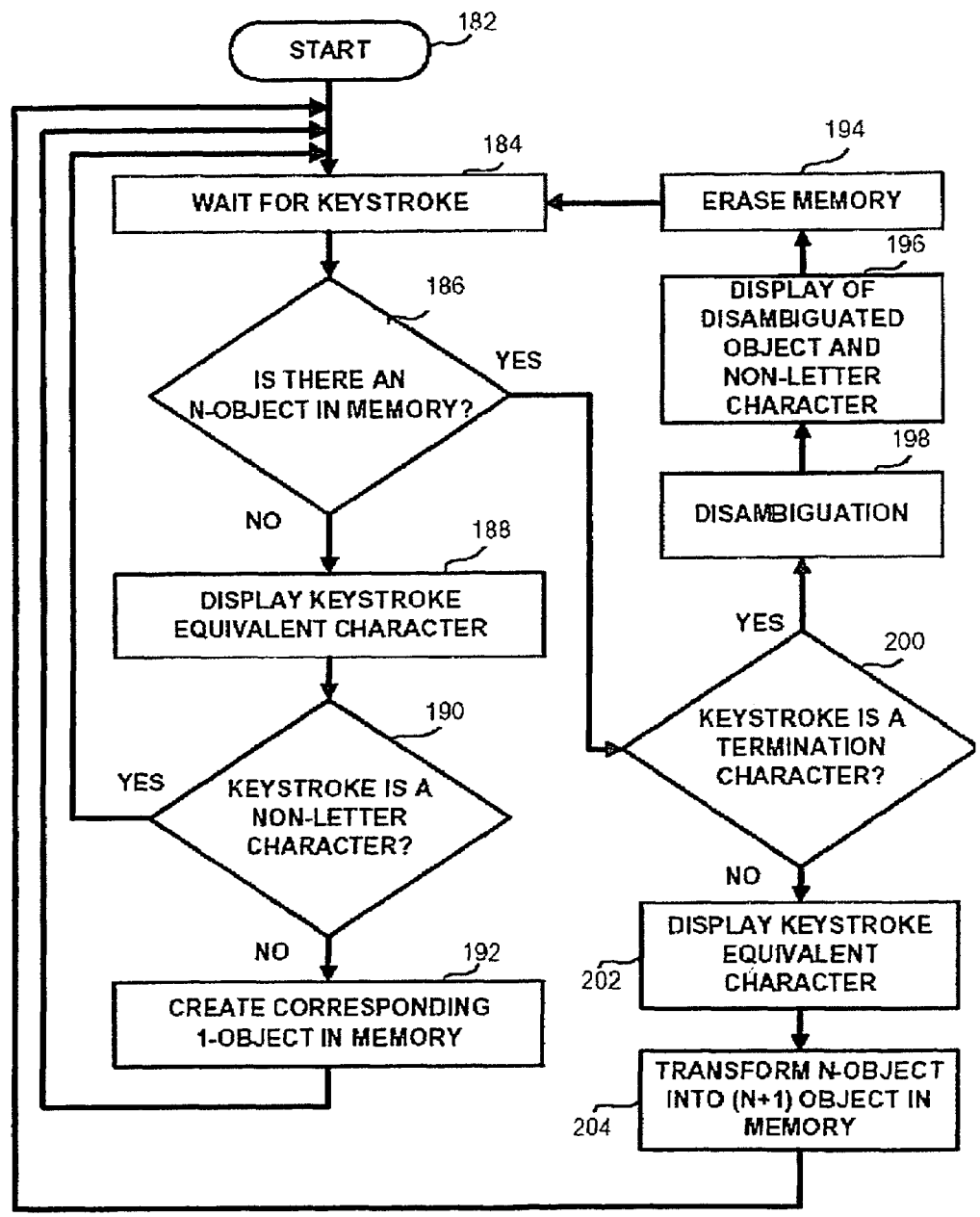
FIG. 8 is a flow chart illustrating the filtering process, in accordance with the preferred embodiment of the present invention.

Referring now to FIG. 8 that represents the flowchart of the filtering process. First, the process will be described schematically via the ordered step sequences on the accompanying flowchart of FIG. 8. At start-block 182 the process begins and at wait-block 184 the process waits for a keystroke. Following the performance of a keystroke at decision block 186 it is determined whether an n-object exists in the memory. If the result is negative then at action block 188 the keystroke equivalent character is displayed. At decision block 190 it is determined whether the keystroke is a non-letter character. If the result is positive then process control proceeds to wait-block 184 in order to wait for the next keystroke. If the result of decision block 190 is negative then at action block 192 a corresponding 1-object is created in memory and process control proceeds to block 184 to wait for the next keystroke. If at decision block 186 the result is positive then at decision block 200 it is determined whether the keystroke is a termination character. If the result is negative then at action box 202 the keystroke equivalent character is displayed, at action block 204 the object in memory is transformed into an n+1 object and process control proceeds to wait-block 184 to wait for the next keystroke. If the result of decision block 200 is positive then at block 198 the disambiguation process is performed. A more detailed description of the operation of the disambiguation block 198 will be described herein after in association with the following drawings. Next, at action block 196 the disambiguated object and non-letter character is displayed, at block 194 the memory is erased and process control proceeds to step 184 to wait for the next keystroke. If at decision block 186 it is determined that an n-object exists in memory then process control activates decision block 200 and according to the result activates either blocks 202, 204, 184 or blocks 198, 194 and 184.

Figure 5A:
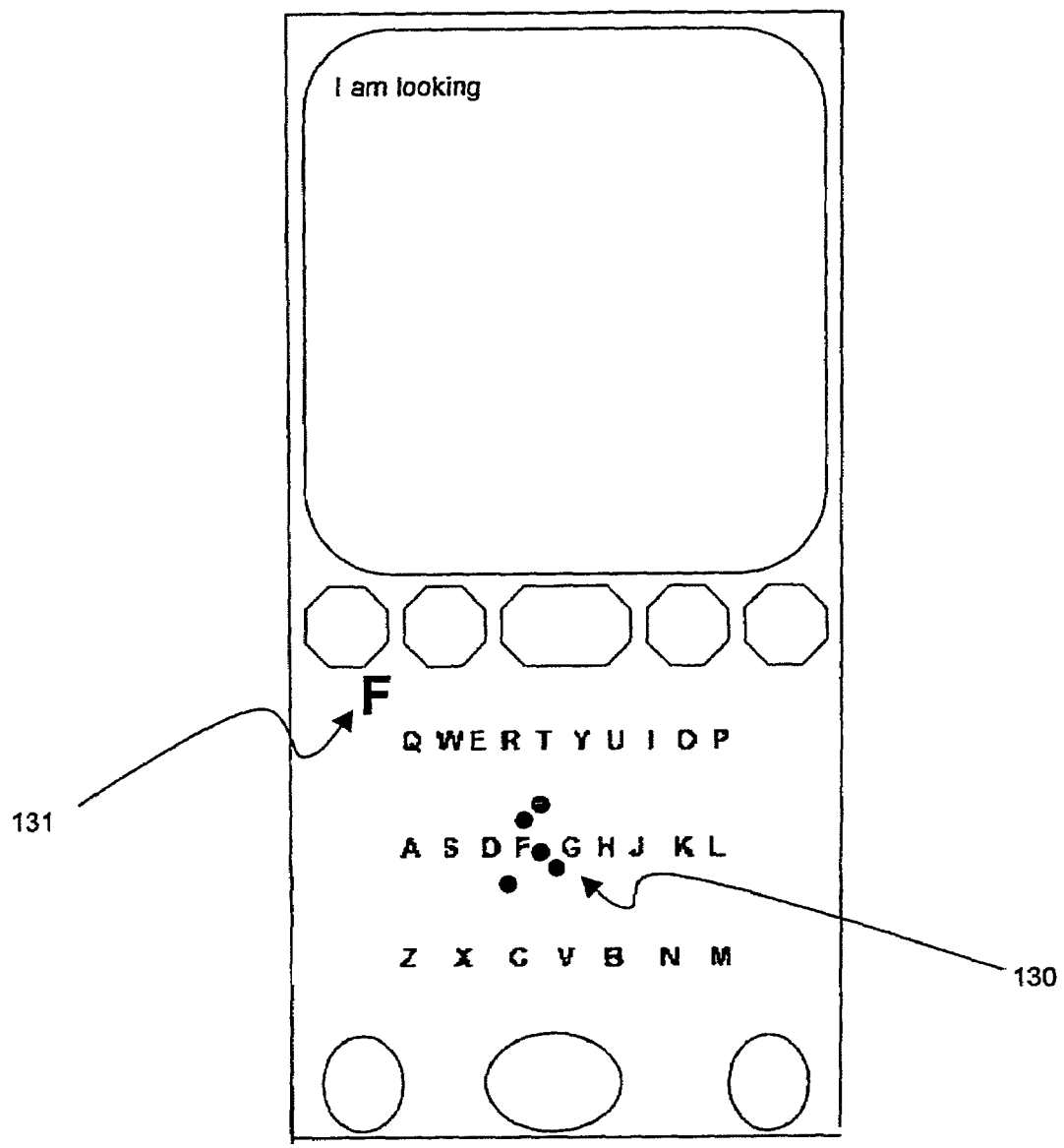
FIGS. 5A, 5B, 5C and 5D illustrate keystroke sequences corresponding to the word "FOR", in accordance with the preferred embodiment of the present invention.
Figure 5B:
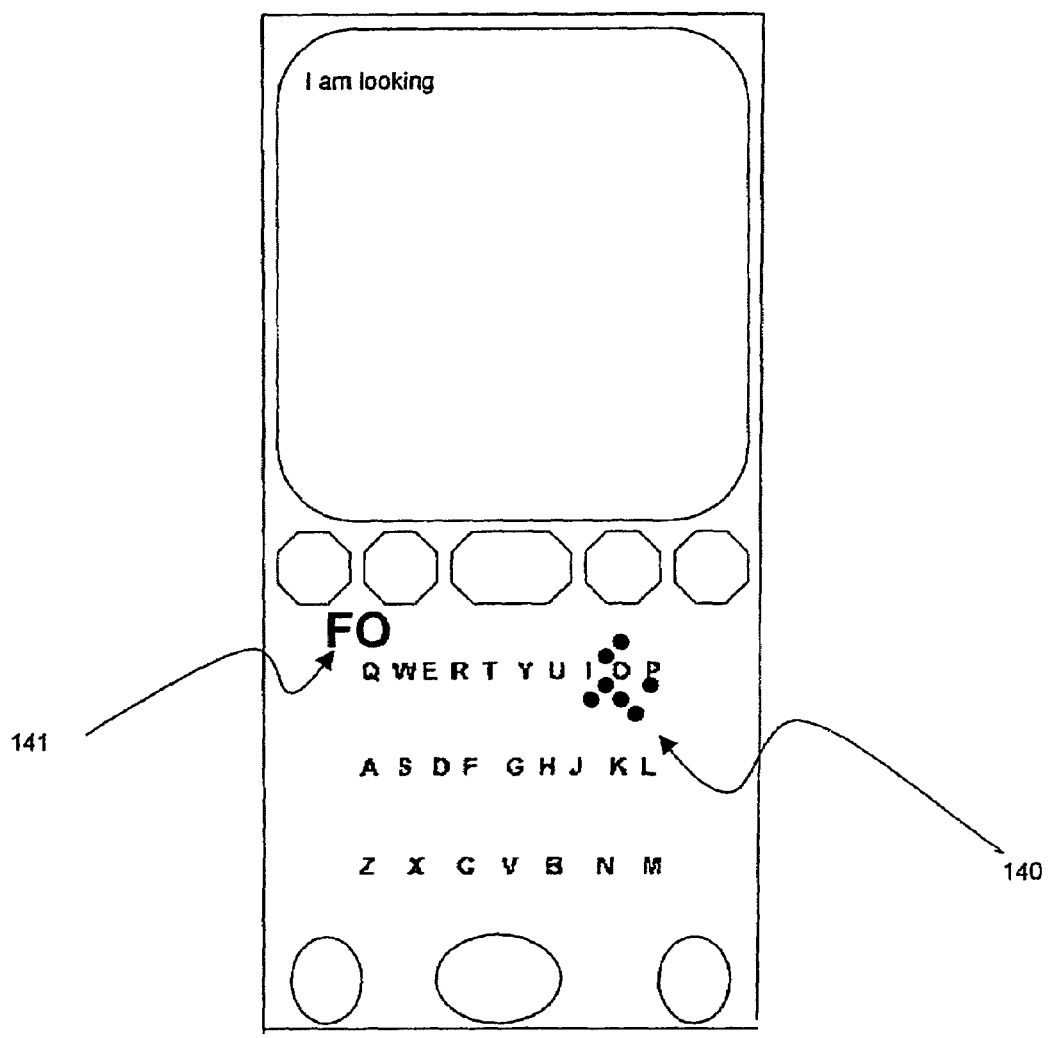
Figure 5C:
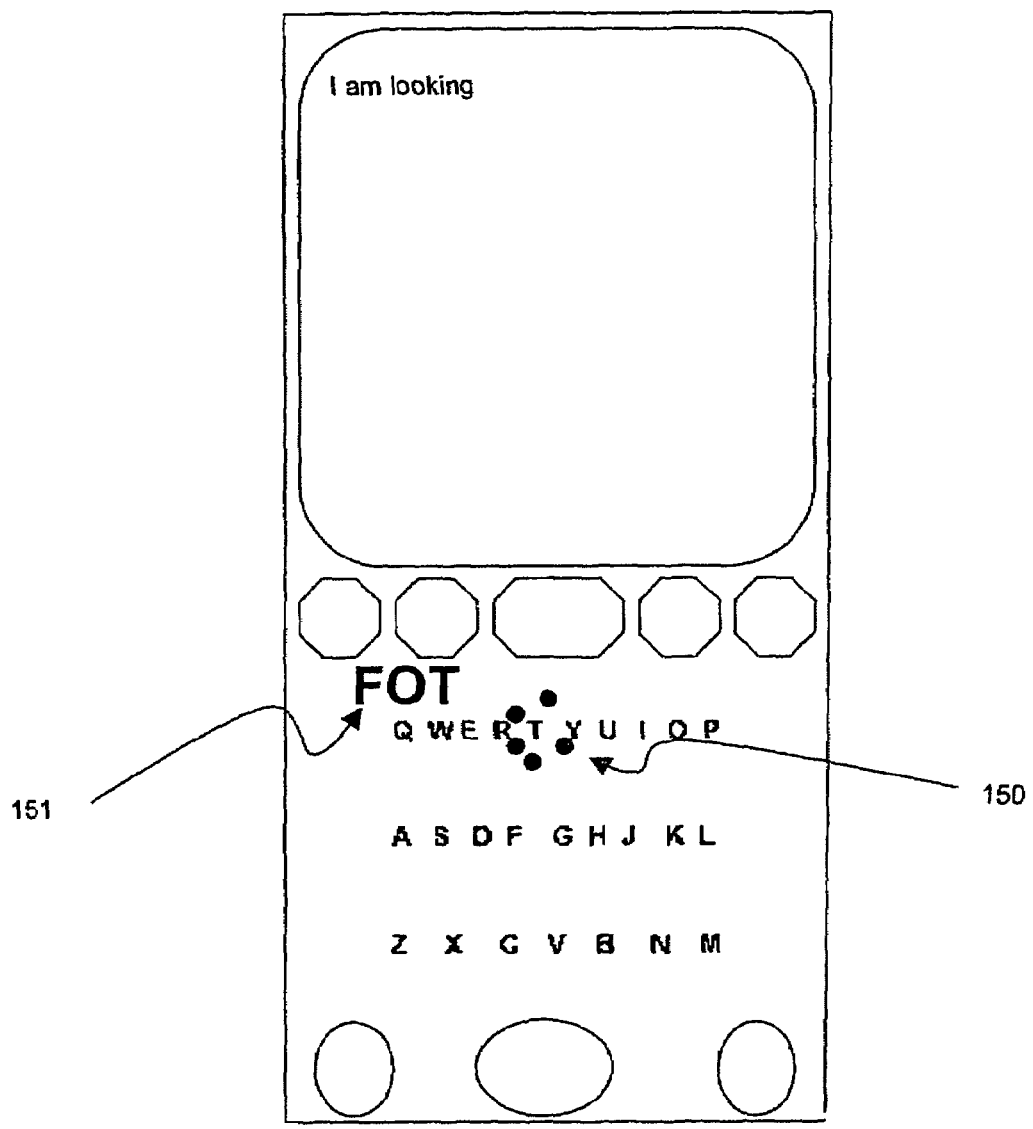
Figure 5D:
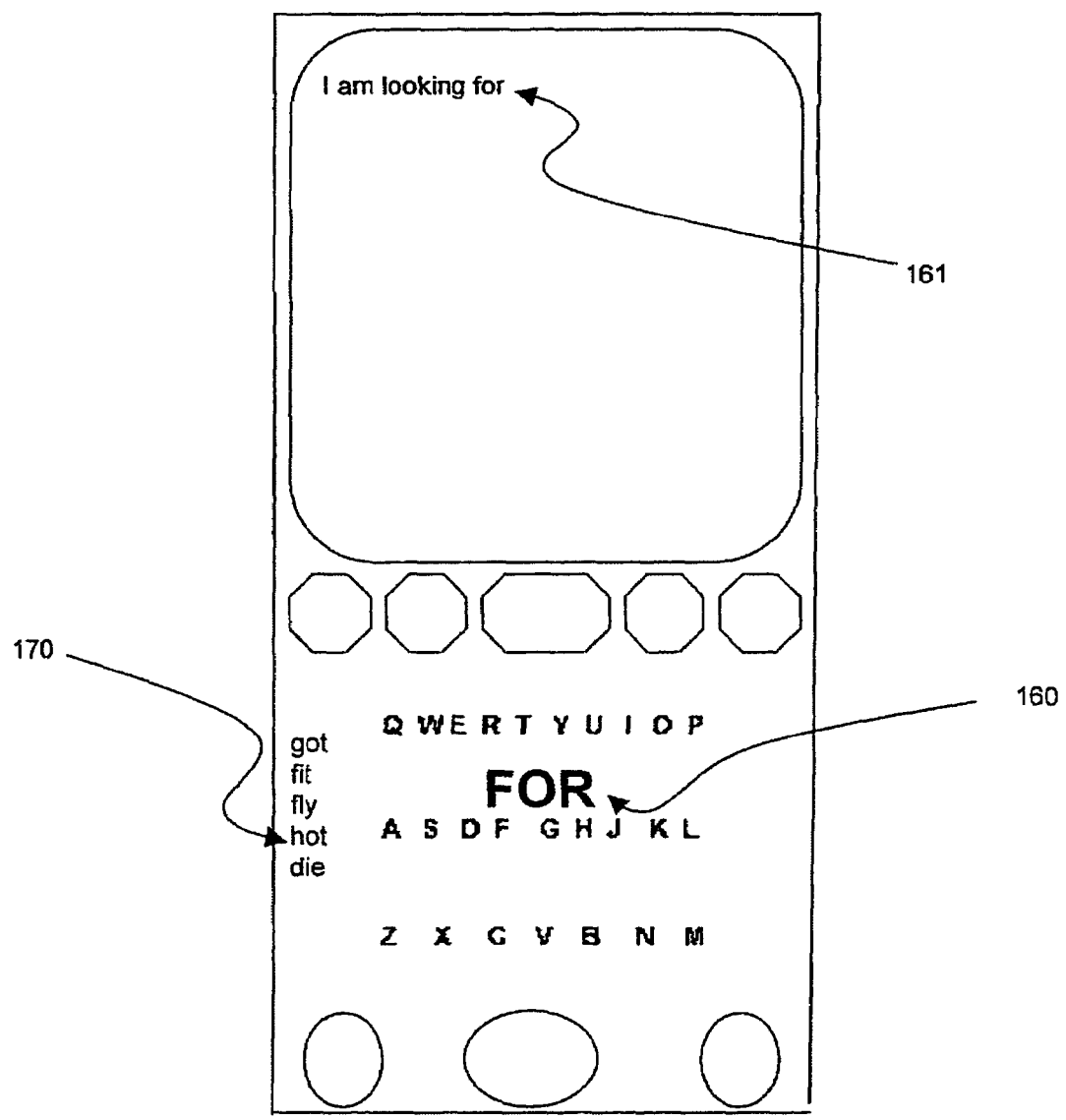

The objective of the filtering process that was presented herein above in a schematic form is to select, given an input keystroke, the list of one or more candidate words, corresponding to the input keystroke. Once the candidate list is established, for each word of the list, a metric distance described in the above embodiments is attributed. The words are sorted according to this distance and the first word shown is the best fit word. The other choices, when they exist, are provided as alternative choices. During the tapping process, the input of a word is associated with an n-object stored in a dedicated memory. The "n" refers to the number of letters already input in this word-stem. When no word is currently being input, the dedicated memory is empty and n is set to zero. When the user taps a keystroke, the first action performed by the process is to check whether the memory is empty or not. When the memory is empty, it means that the user intends to begin a new word or to tap an individual non-letter character. In either case, the process displays the best candidate corresponding to this single letter input. When this character is a non-letter character, no object is created in the dedicated memory, since the user has meant to write a single character and not a word and n=0. When this character is a letter, the process creates a 1-object in memory and n is increased by 1 (n=n+1). At this stage, the process waits for another keystroke. This time, an object is already in the memory. The process then checks whether the keystroke is a termination key or not. When it is a termination key, it means that the user has finished writing the word, and disambiguation is performed, followed by displaying of the disambiguated word. This word replaces on the screen all the previous displayed letters as illustrated in FIG. 5D. The memory is then erased, n is set to zero and the process begins again. When the next input is a letter, the best candidate corresponding to this keystroke is displayed and the n-object stored in the dedicated memory is replaced by an n+1 object that takes into consideration the new keystroke. The process then waits for the next keystroke and the consequent to the performance of the keystroke the process starts again.

Since the method of the present invention is based on word recognition and not on character recognition, the apparatus of the present invention preferably contains or is associated with or connected to a database of words, also referred to as the system dictionary. The dictionary preferably contains more than about 50,000 words. Each word has an associated frequency of use and number of letters. The dictionary is divided into categories according to the first and last letters of each word. The dictionary is therefore composed of about 26×26=676 classes. A pointer indicates the index of the first word of a given class. For example, POINTER (13,12) indicates the first word belonging to the class containing words starting with the letter "D", and ending with the letter "F" (when letters are arranged in a QWERTY order). Another array indicates the number of letters comprising each word. Within each class, words may be arranged according to the QWERTY order. However, this is not required since the elimination process is sufficiently fast so as not to need QWERTY arrangement within each class.

Figure 9:
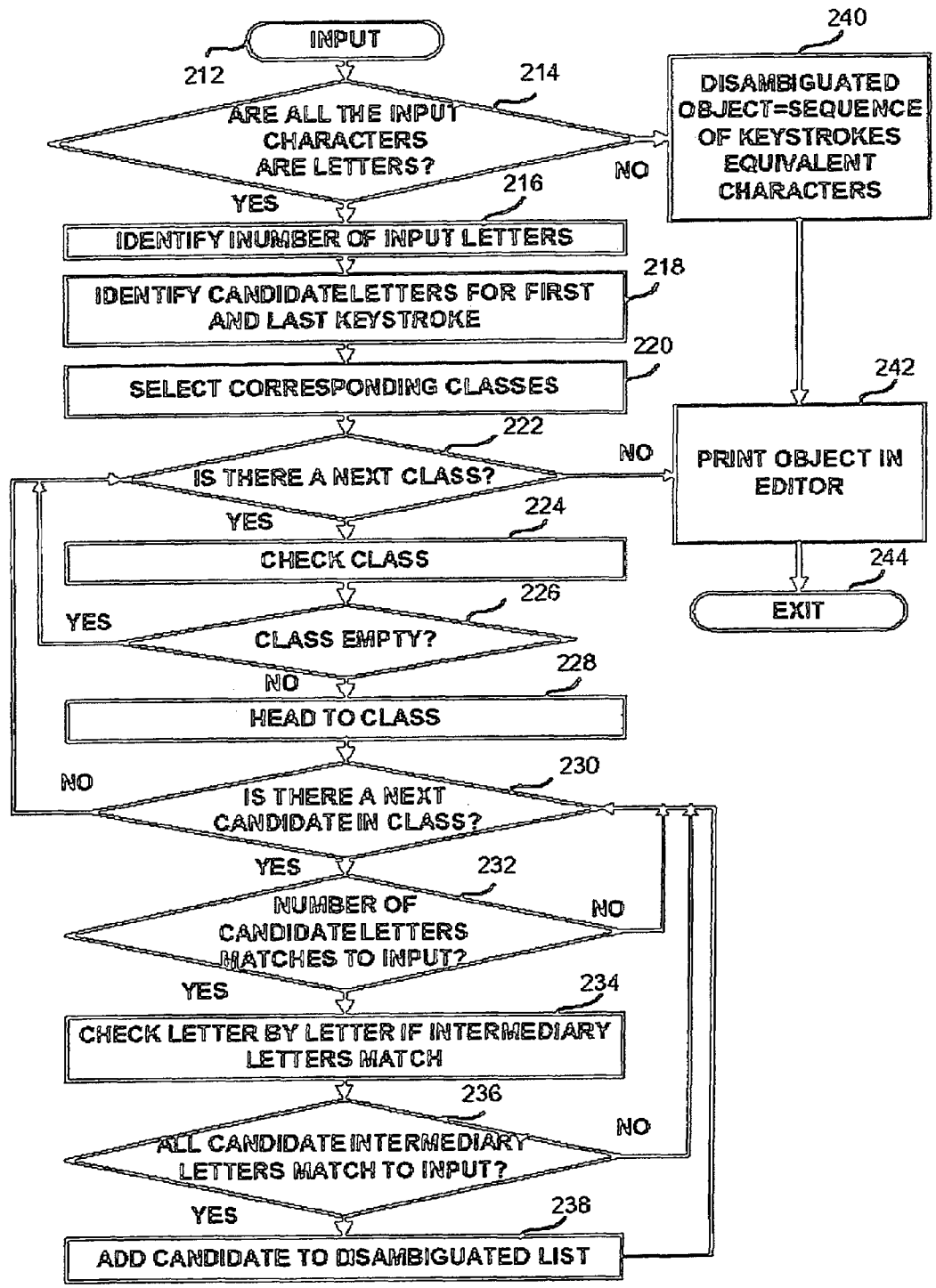
FIG. 9 is a flow chart illustrating a preferred embodiment for a disambiguation process, in accordance with the preferred embodiment of the present invention.

Referring now to FIG. 9 that represents the flowchart of the disambiguation process. First, the process will be described schematically via the ordered step sequences on the accompanying flowchart of FIG. 9 At input block 212 the input from the filtering process is received. The input is a distinct word having one or more characters. At decision block 214 it is determined whether all the input characters are letters. If the result is negative then at action block 240 the disambiguated object is set to the sequence of keystroke equivalent characters at action block 242 the object is displayed in the editor and at exit-block 244 the disambiguation process is terminated. In contrast, if the result of the decision block 214 is positive then at action block 216 the number of input letters is identified. At action block 218 the candidate letters of the first and last keystrokes are identified and at action block 220 the corresponding classes are selected. At decision block 222 it is determined whether there is a next class. If the result is negative then at action block 242 the object is displayed in the editor and at exit-block 244 the disambiguation process is terminated. In contrast, if the result of decision block 222 is positive that at action block 224 the class is checked and at decision block 226 it is determined whether the class is an empty class. If the result is positive then process control proceeds to decision block 222 to check whether there is a next class. In contrast, if the result of decision block 226 is negative then the head of the class is accessed at action block 228. At decision block 230 it is determined whether a next candidate word exists in the class. If the result is negative then program control proceeds to decision block 222 to check for the existence of a next class. In contrast, if the result of decision block 230 is positive then at decision block 232 it is determined if the number of letters of the candidate word matches the number of keystrokes of the input. If the result is negative then process control proceeds to decision block 230 to check for the existence of a next candidate word in the class. In contrast, if the result of decision block 232 is positive then at action block 234 the letters of the candidate word that are in the intermediary position (between the first and the last letters) are checked one by one against the candidate letters corresponding to each keystroke of the input. Next at decision block 236 it is determined whether all the candidate word intermediary letters match to the candidate letters corresponding to each keystroke of the input. If the answer is negative then process control proceeds to decision block 230 in order to check for the existence of a next candidate word in the class. In contrast, if the result of decision block 236 is positive then at action block 238 the candidate word is added to the disambiguated list and process control proceeds to decision block 230 to check whether there is an additional candidate in the class.

The disambiguation process begins when the user taps a termination key, after all the keystrokes corresponding to the desired word have been input. After each keystroke, the most probable character, which is the closest to the center of mass of the activated dynamic keyboard region, is displayed. When the sequence is completed, the most probable word solution is displayed and replaces the above most probable characters. Other solutions (when they exist) are presented as secondary choices. When all the keystrokes are non-ambiguous, the first choice candidate is the word which corresponds to the sequence of the letters tapped by the user, even if it does not belong to the dictionary. Secondary word candidates of the disambiguated list are generated according to the regular disambiguation process. At the start of the disambiguation process, in which the candidate word list is reduced to one or more word solutions, the parameters known to the process are the number of letters of the input word (equal to the number of keystrokes), and the candidate letters for each intermediary key. The disambiguation engine follows an elimination process. The candidate word list that is produced following inputting of a word is comprised of candidate words in which the first letter matches with one of the candidate letters of the first keystroke, the last letter matches with one of the candidate letters of the last keystroke, and the number of letters in the candidate word is equal to the number of keystrokes. This leads to a first reduced group of candidate words. The candidate word list is then reduced further by checking if all of the intermediary letters in each word match at least one of the candidate letters of the corresponding middle keystroke. When the word is composed of two letters or less, there are no intermediary letters. The number of intermediary letters is equal to the number of keystrokes minus two. This process ends with a more reduced group of candidate words.

The disambiguation process is activated after specific events during the input process as described previously at block 198 of FIG. 8. The disambiguation process is applied for any input composed of one or more keystrokes. Each of these keystrokes has its own characteristics and can correspond to a single character or to multiple characters. Initially, the apparatus checks whether the input is non-ambiguous. A non-ambiguous input is an input in which each keystroke corresponds to one single known character. When the input is non-ambiguous, the disambiguated object is the sequence of the characters corresponding to the sequential keystrokes, even when this sequence forms a word that does not belong to the dictionary. Following the display of this word, the user has the option of updating this sequence of letters as a word into the dictionary. The process then continues the disambiguation process as if the input was ambiguous.

The process identifies the number n of keystrokes in the input sequence. It then identifies the n1 candidate letters for the first keystroke and the n2 candidate letters for the last keystroke. As seen previously, the dictionary is arranged in about 26*26 classes, where each class is composed of words beginning with a given letter and ending with the same or another given letter. Consequently, the process identifies the n1*n2 classes corresponding to the input and representing the words beginning with one of the candidate letters of the first keystroke and ending with one of the candidate letters of the last keystroke, and then performs a disambiguation process within each class. Each class is checked successively. When a class is empty, meaning that there are no words in the dictionary beginning with a given letter and ending with a given letter, the process checks continues to the next class. When the class is not empty, each word of the class is checked successively. When a specific word candidate has a number of letters that does not match with the number of keystrokes of the input, it is rejected. When the number of keystrokes matches, each intermediary letter of the candidate word is compared to the candidate letters of the corresponding keystroke. When it does not match, the candidate word is rejected, and when it does, it is added to the disambiguated list. This process continues until the words belonging to the given class are checked. When these candidates have been checked, the process continues to the next class, and until all the classes have been checked. The resulting candidates words, also referred to as the disambiguated list, are then sorted according to the metric discussed above:

$$MATCH = Constant * I MAX^2 / (FREQ * WEIGHT^2)$$

Certain additional elements such as language considerations could be taken into account. The first-choice word of the sorted remaining list is displayed by default on the display area (see FIG. 5D) and the others words, such as secondary or second-choice words, when and if they exist, are displayed in the selection list. The purpose of this method is to make the user able to input as much text as possible without having to use selection list. The non-use of this list is an indicator of the intuitiveness of the method. The less the user uses it, the more intuitive the method is. The focus of attention of the user is concentrated primarily on the keyboard letter region and not on the editor region, and thus word input can be conducted in a fast manner. In order to achieve that, the first choice is temporarily displayed in large letters on the keyboard center 160 of FIG. 5D. It is only when the user sees that this first choice does not correspond to the solution he intended that he needs to look at the secondary choices 170 list in order to select the correct solution.

The second preferred embodiment for the present invention regards a PDA-sized keyboard which is operated upon and activated using multiple fingers. In the second preferred embodiment the size of the handheld device is somewhat larger. Ideally, the device has the dimensions of a PDA, such as, for example, about 10 cm×6 cm, but it can have the size of a PDA keyboard, such as for example about 6.5 cm×2.3 cm, or the like. Such keyboard is operated by multiple fingers, as where using standard computer keyboards. The advantage of such keyboards concerns the increased speed of input and the intuitive way of tapping. Most users are familiar with the QWERTY layout and therefore are not required to learn a new text input alphabet. Even when the keyboard is larger, ambiguities may still exist.

For the purpose of easier understanding, it should be noted that "events" refer to the keystrokes actually tapped by the user represent also the intention of the user, and "keystrokes" refer to the interpretation of these events by the proposed apparatus and method. The particularity of the input in the second preferred embodiment is that two events input almost simultaneously may be interpreted as either one or two keystrokes, leading to a new kind of ambiguity based on the number of keystrokes. Reciprocally, one single event may be interpreted as two neighboring keystrokes. Two different solutions for solving the problem will be described below. However, it is to be noted that ambiguities based on the number of events tapped by the user occur only in very specific situations. Ambiguities such as those described above occur only when all the following conditions are met: the lapse between two keystrokes is under a given threshold, and the characters belonging to a given keystroke, corresponding to either one or two events, are topological neighbors. As an example, when the characters belonging to a keystroke are "E" "R" and "T", they may be interpreted as either one event, corresponding to "E" or "R" or "T", or two events, "E" "R" and "T" or "E" and "R" "T". Obviously, two non-neighboring letters cannot belong to the same event. As an example, if the keystroke corresponds to the letters "E" and "T", they do not belong to the same event since the "R" which separates them was not tapped.

In specific configurations, when the keyboard is large enough, the number of letters per event will not likely exceed two Consequently, for such keyboards, ambiguities on the number of events occur when keystrokes have two letters and may be interpreted as either a single two-letter event or as two separate one-letter events. For these keyboards, three-letter keystrokes must correspond to two events, three events cannot be input simultaneously, but these two events can be interpreted in two ways: the first event having two letters and the second event having one letter, or the opposite.

A large keyboard configuration with a maximum of 2 letters per event will first be considered. The algorithm is very similar to the one described in the preferred embodiment above. The difference is that each time there is an ambiguity in the number of events; all possible candidates are stored in memory. In the following, it is assumed that when a keystroke is considered as two events, the chronological order of those two events is not known.

When the ambiguity is on a single event, there are four possibilities of disambiguation. The possibilities are: two words with n events and two with n+1 event (n being the minimum number of events corresponding to this input). When there are two ambiguities on events, there are 16 possibilities of disambiguation: 4 with n events, 8 with n+1 event and 4 with n+2 events.

For an illustrative example, suppose that the user intends to tap the word "YACHT" and that the keystrokes are the following:

Keystroke 1: "Y" "U" may be interpreted as either two events "Y" and "U" or "U" and "Y" or as one event ["Y" or "U"]

Keystroke 2: "A" "S" may be interpreted as either two events "A" and "S" or "S" and "A" or as one event ["A" or "S"]

Keystroke 3: "C" (non ambiguous)

Keystroke 4: "W" (non ambiguous)

Keystroke 5: "T" (non ambiguous)

Consequently, the possible words resulting from these 5 keystrokes are as follows. If the apparatus considers 5 events: YACHT, YSCHT, UACHT, USCHT. If the apparatus considers 6 events: YUACHT, YUSCHT, YASCHT, UASCHT, UYACHT, UYSCHT, YSACHT, USACHT. If the apparatus considers 7 events: YUASCHT, UYASCHT, UYSACHT, YUSACHT When there are ambiguities on m events, the number of candidates is $4^m$. The algorithm is very similar to the one described in association with FIG. 9, the only difference being that the method considers candidates for the input having a variable number of letters. Instead of being activated once with n-letter candidates as in the preferred embodiment above, the disambiguation process is activated m+1 times with (n, n+1, . . . n+m) letters per candidate. This new module dealing with this new ambiguity is located between blocks 216 and 218 of FIG. 9.

A smaller keyboard configuration with a maximum of three letters per event will now be considered. This situation is more unlikely to happen than the previous one (maximum of 2 letters per keystroke). The following is an example of the combinatory when there is a single ambiguity on the number of keystrokes. For instance, a specific keystroke has three characters E, R, T.

The method can interpret this keystroke in 9 possible ways:
1 event: "E"
1 event: "R"
1 event: "T"
2 events: "E" and "R"
2 events: "E" and "T"
2 events: "R" and "T"
2 events: "R" and "E"
2 events: "T" and "R"
2 events: "T" and "E"

The method does not take into consideration the possibility that the keystroke is in fact three events, since it supposes that the user does not tap three times in such a short lapse of time. Consequently, each keystroke containing 3 letters leads to 9 ambiguities.

The generalization for n events with m ambiguities on the number of keystrokes is as follows. The disambiguation process is activated m+1 times with (n, n+1, . . . n+m) letters per candidate. However, this time the maximum number of candidates is up to $9^m$ (in case that each keystroke contains 3 characters).

Additional embodiments and modifications will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

I claim:

1. A reduced keyboard apparatus for word recognition in text input devices, adapted to be finger activated, the apparatus comprising;
    a keyboard adapted for displaying at least two letters and characterized by having no discrete boundary between the at least two letters, and adapted for enabling input of a word by a succession of finger-activated keystrokes on the keyboard, wherein a single keystroke on the keyboard activates an at least one keyboard region defined according to characteristics of the single keystroke and contains at least one letter candidate;
    probability computing means for computing a probability value associated with the at least one letter candidate in the at least one keyboard region;
    an at least one dictionary having an at least one word class categorized according to the first or last letters of an at least one word of the at least one dictionary, wherein the at least one word is associated with a frequency of use value; and
    list builder means for generating an at least one candidate word list derived from the at least one word class of the at least one dictionary for providing a best candidate word for the input word based on the probability value associated with the at least one letter candidate, the number of keystrokes performed during input of a word, and the frequency of use value associated with the at least one candidate word.

2. The reduced keyboard apparatus of claim 1 wherein the keyboard region is defined by a cluster of points.

3. The reduced keyboard apparatus of claim 1 wherein the keyboard region is defined by a continuous area.

4. The reduced keyboard apparatus of claim 1 utilizes a QWERTY keyboard layout.

5. The reduced keyboard apparatus of claim 1 utilizes an alphabetical keyboard layout or any other appropriate keyboard layout.

6. The reduced keyboard apparatus of claim 1 utilizes a keyboard layout adapted for at least one natural language.

7. The reduced keyboard apparatus of claim 1 having dimensions of about 3 centimeters×2.7 centimeters or less.

8. A method for word recognition associated with finger activated text input on a reduced keyboard apparatus, the method comprising;
    inputting an at least one word through a keyboard adapted for displaying at least two letters and characterized by having no discrete boundary between the at least two letters, and adapted for enabling input of the at least one word by a succession of keystrokes on the keyboard, wherein a keystroke on the keyboard activates an at least one keyboard region defined according to characteristics of the keystroke and contains an at least one letter candidate therein,
    computing a probability value associated with the at least one letter candidate in the at least one keyboard region;
    selecting at least one class of an at least one dictionary, the at least one dictionary comprising an at least one word class categorized according to the first or last letters of an at least one candidate word in the at least one dictionary with which an at least one input word is associated therewith thereby producing an at least one candidate word list, and successively eliminating and sorting words in the candidate word list to provide an at least one solution for the at least one input word;
    wherein the step of eliminating and sorting weighs the probability value associated with the at least one letter candidate determined by the maximum horizontal distortion, the number of keystrokes performed during input of a word, and the frequency of use value of the at least one candidate word.

9. The method of claim 8 wherein the step of computing a probability value associated with the at least one letter candidate interprets a set of discrete points as surfaces wherein each point is associated with a density.

10. The method of claim 8 wherein the at least two letters are not defined by limited boundaries.

11. The method of claim 8 wherein the at least two letters are defined by limited boundaries.

12. The method of claim 8 wherein the letters are arranged in three rows and wherein the method further comprises identifying the row of the keyboard upon which a keystroke was performed.

13. The method of claim 8 wherein termination keys are located in a separate location from the letters keys.

14. The method of claim 8 further comprises the step of comparing for each keystroke the probability values associated with candidate letters in a first row of the keyboard to the probability values associated with the candidate letters in a second row of the keyboard.

15. The method of claim 8 wherein the keyboard region is defined by a cluster of points used to generate an at least one input area wherein each member of the cluster of points is associated with a density value.

16. The method of claim 8 wherein the keyboard region is defined by a continuous area and wherein each point of the continuous area is associated with a density value.

17. The method of claim 8 wherein an at least one letter of a first row and an at least one letter of a second row are associated with a density matrix.

18. The method of claim 17 wherein an element of the density matrix depends on the horizontal distance between the corresponding candidate letter and a pixel of the input area.

19. The method of claim 8 wherein the step of eliminating and sorting words from the at least one candidate word list comprises computing a matching distance for a candidate word using the maximum distortion of the word.

20. The method of claim 8 wherein the keyboard region is defined by a cluster of points and wherein the boundary input area is defined by joining the external pixels of the cluster.

21. The method of claim 8 further comprises calibrating the input area abscissa center with the position of the corresponding keystroke for an individual user input.

22. A computer-readable storage medium containing a set of instructions for a general purpose computer having a user interface comprising a screen display and a keyboard, the set of instructions comprising:

an input routine associated with a finger activated keyboard adapted for displaying at least two letters and characterized by having no discrete boundary between the at least two letters, and adapted for enabling input of an at least one input word by a succession of keystrokes on the keyboard, wherein a keystroke on the keyboard activates an at least one keyboard region defined according to characteristics of the keystroke and contains an at least one letter candidate therein, a probability value computing routine computing a probability value associated with the at least one letter candidate in the at least one keyboard region; and a class selection routine associated with an at least one dictionary, the at least one dictionary comprising an at least one word class categorized according to the first and last letters of an at least one word in the at least one dictionary to which the at least one input word could belong to produce an at least one candidate word list, and successively eliminating and sorting words in the candidate word list to provide an at least one solution for the at least one input word.

23. A method for recognizing an input word entered as text input constructed from consecutive keystrokes on a keyboard having no discrete boundaries between the keys and having keys substantially smaller than a finger of a user, the method comprising:

calculating for each keystroke a letter probability value based on the input area and yielding at least one letter candidate; and activating a disambiguation process based upon the at least one letter candidate, thereby providing disambiguation of the input word entered.

24. The method of claim 23, wherein said letter probability value is determined by associating each keystroke with one or more numbers measuring the likelihood of various candidate letters to be the user's choice of letters.

25. The method of claim 23, wherein the disambiguation process further comprises filtering the words to determine the optimal candidate list of words through the use of a dictionary of inflected words.

\* \* \* \* \*